US011880950B2

(12) United States Patent
Saxena et al.

(10) Patent No.: US 11,880,950 B2
(45) Date of Patent: Jan. 23, 2024

(54) SELECTIVE OFFLOAD OF WORKLOADS TO EDGE DEVICES

(71) Applicant: Meta Platforms Technologies, LLC, Menlo Park, CA (US)

(72) Inventors: Pranav Saxena, San Francisco, CA (US); Brian Johnston, Grand Prairie, TX (US); Jun Woo Shin, Queens, NY (US); Tao Tao, Burlingame, CA (US); Alaukik Aggarwal, San Jose, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 61 days.

(21) Appl. No.: 17/694,262

(22) Filed: Mar. 14, 2022

(65) Prior Publication Data

US 2022/0245904 A1 Aug. 4, 2022

(51) Int. Cl.
*G06T 19/00* (2011.01)
*G06T 1/60* (2006.01)
(Continued)

(52) U.S. Cl.
CPC .......... *G06T 19/006* (2013.01); *G06F 9/5016* (2013.01); *G06F 11/3409* (2013.01);
(Continued)

(58) Field of Classification Search
CPC .. G06F 11/3409; G06F 9/5016; G06F 9/5038; G06F 11/3442; G06F 9/505; G06T 1/60; G06T 19/006; G06T 2200/04; G06T 7/20; G06N 20/00; H04L 47/83; H04L 65/765; G06V 20/20; G06V 10/25
See application file for complete search history.

(56) References Cited

U.S. PATENT DOCUMENTS 7,082,302 B1 7/2006 Maitland et al.
8,824,433 B2 9/2014 Chen et al.
(Continued)

OTHER PUBLICATIONS

Mangiante S., et al., "VR is on the Edge: How to Deliver 360° Videos in Mobile Networks," Research Gate, in Proceedings of VR/AR Network 2017, Aug. 25, 2017, 7 pages.
(Continued)

*Primary Examiner* — Xilin Guo
(74) *Attorney, Agent, or Firm* — Potomac Law Group, PLLC; Dannon G. Allbee

(57) ABSTRACT

Implementations selectively offload visual frames from a client device to an edge system for processing. The client device can receive streaming visual frames and a request to process the visual frames using a data service. The client device can offload visual frames to an edge system preloaded with a workload resource that corresponds to the requested data service. After the edge system processes the offloaded visual frames using the workload resource, the edge system can return the processed visual frame to the client device. In some implementations, the edge system and client device are situated in a network such that a latency for the offload communications support real-time video display. A cloud system can maintain a registry of edge systems and provide client devices with information about nearby edge systems. The cloud system can also preload the edge systems with workload resources that correspond to data services.

20 Claims, 14 Drawing Sheets

(51) Int. Cl.
  *G06F 11/34* (2006.01)
  *G06F 9/50* (2006.01)
  *G06N 20/00* (2019.01)
(52) U.S. Cl.
  CPC .......... *G06T 1/60* (2013.01); *G06F 2209/505* (2013.01); *G06N 20/00* (2019.01)

(56) References Cited

U.S. PATENT DOCUMENTS

| | | |
|---|---|---|
| 8,885,466 B1 | 11/2014 | Seleznyov |
| 9,294,973 B2 | 3/2016 | Liu et al. |
| 9,467,923 B2 | 10/2016 | Karaoguz |
| 9,736,703 B2 | 8/2017 | Goldsmith et al. |
| 10,452,444 B1 | 10/2019 | Jibaja et al. |
| 11,588,910 B2 | 2/2023 | Thulasi et al. |
| 2009/0156221 A1 | 6/2009 | Bae et al. |
| 2010/0248725 A1 | 9/2010 | Yang |
| 2011/0250895 A1 | 10/2011 | Wohlert et al. |
| 2015/0017985 A1 | 1/2015 | Safavi |
| 2015/0036663 A1 | 2/2015 | Kilpatrick, II et al. |
| 2015/0065135 A1 | 3/2015 | Claussen et al. |
| 2015/0304913 A1 | 10/2015 | Uusitalo et al. |
| 2016/0309360 A1 | 10/2016 | Noldus |
| 2018/0102985 A1 | 4/2018 | Byers et al. |
| 2018/0184350 A1 | 6/2018 | Hassan |
| 2018/0295546 A1 | 10/2018 | Crawford |
| 2019/0208007 A1* | 7/2019 | Khalid ................ H04L 67/1021 |
| 2019/0324800 A1 | 10/2019 | Chhabra et al. |
| 2019/0373521 A1 | 12/2019 | Crawford |
| 2021/0250838 A1 | 8/2021 | Lu et al. |
| 2021/0327018 A1 | 10/2021 | Carranza et al. |
| 2022/0113790 A1* | 4/2022 | Doshi ................... G06F 9/5027 |
| 2022/0114010 A1* | 4/2022 | Guim Bernat .......... H04L 47/83 |
| 2022/0180639 A1 | 6/2022 | Ono et al. |
| 2022/0188028 A1* | 6/2022 | Mesnier .................. G06F 3/067 |
| 2022/0197773 A1* | 6/2022 | Butler ................... G06F 9/5038 |
| 2022/0210165 A1 | 6/2022 | Rosas Bustos et al. |
| 2022/0245903 A1 | 8/2022 | Saxena et al. |
| 2022/0247828 A1 | 8/2022 | Thulasi et al. |
| 2022/0247970 A1 | 8/2022 | Thulasi et al. |
| 2022/0255988 A1 | 8/2022 | Salmasi |
| 2022/0292819 A1 | 9/2022 | Raychaudhuri et al. |
| 2022/0311678 A1 | 9/2022 | Karjee et al. |
| 2022/0312057 A1 | 9/2022 | Lee et al. |

OTHER PUBLICATIONS

International Search Report and Written Opinion for International Application No. PCT/US2023/015159, dated Jun. 22, 2023, 10 pages.

Younis A., et al., "Latency-aware Hybrid Edge Cloud Framework for Mobile Augmented Reality Applications," 17th Annual IEEE International Conference on Sensing, Communication, and Networking (SECON), Jun. 22, 2020, 9 pages.

* cited by examiner

US 11,880,950 B2

SELECTIVE OFFLOAD OF WORKLOADS TO EDGE DEVICES

CROSS-REFERENCE TO RELATED APPLICATION(S)

This application is related to U.S. patent application Ser. No. 17/694,241, titled "Selective Offload of Workloads to Edge Devices;" and U.S. patent application Ser. No. 17/694,277, titled "Offloading Visual Frames to a Gateway Device;" and to U.S. patent application Ser. No. 17/694,286, titled "Offloading Visual Frames to a Gateway Device;" each filed on Mar. 14, 2022, and each is herein incorporated by reference in its entirety.

TECHNICAL FIELD

The present disclosure is directed to selectively offloading visual frames to an edge device for processing.

BACKGROUND

Client devices, such as smartphones, have progressively gained compute power and functionality over time. However, additional classes of client devices, such as wearable devices, smart speakers, Internet of Things ("IoT") connected devices, and the like, have created a variety of capabilities where some client devices are capable of certain compute workloads that other client devices are not. In addition, client devices are increasingly relied upon to deliver sophisticated services to users, such as artificial reality environments and video processing. Techniques that can improve the delivery of sophisticated services at client devices with different levels of computing power can provide substantial value to users and service providers.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
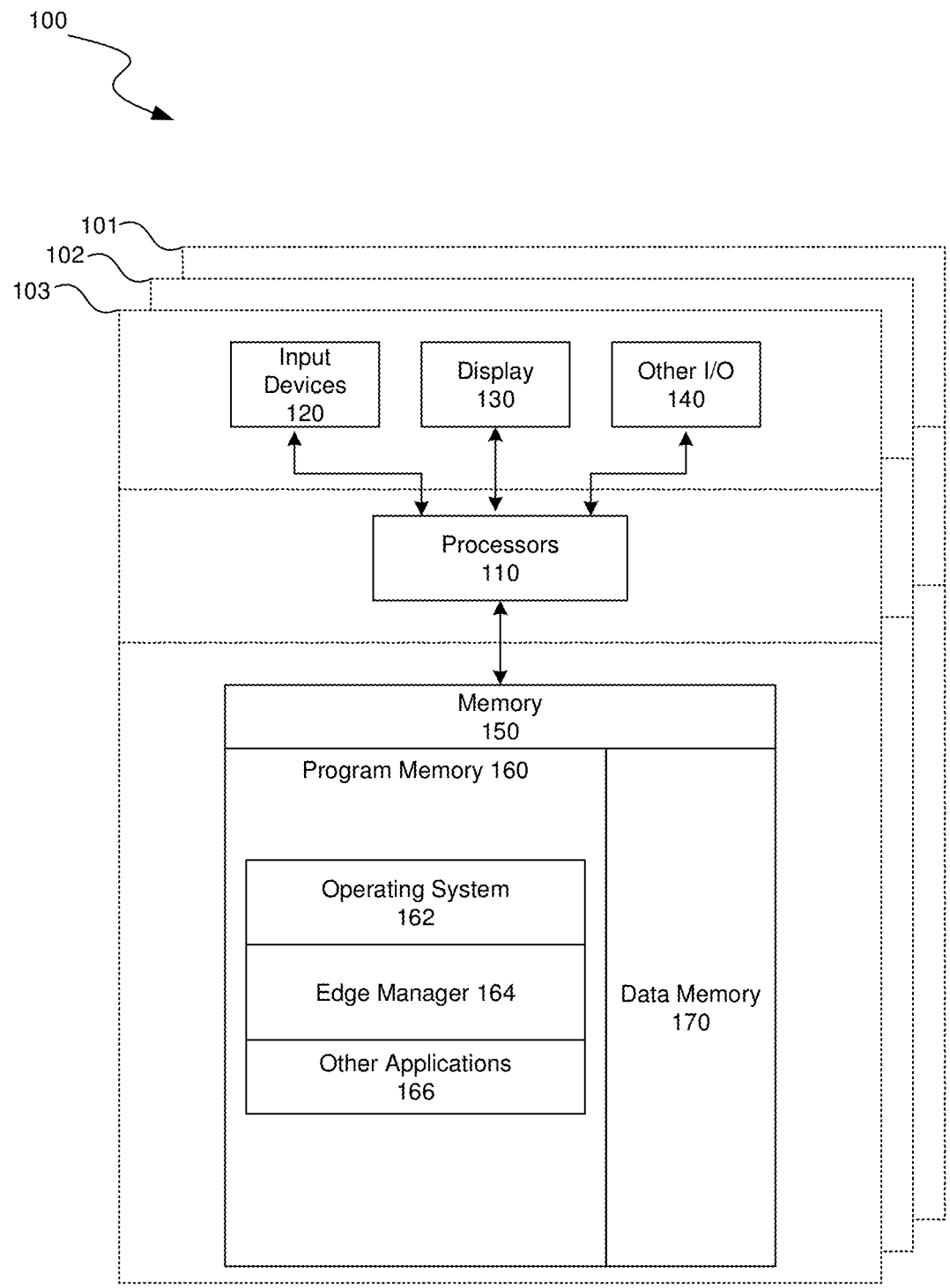
FIG. 1 is a block diagram illustrating an overview of devices on which some implementations of the present technology can operate.

Aspects of the present disclosure are directed to the selective offload of visual frames to an edge system for processing. Implementations of client devices and/or client systems (e.g., client mobile devices, XR devices, wearable devices, etc.) include components to capture visual frames, such as streaming video. Different classes of client devices/systems can have different compute power. Accordingly, applications running on these client devices/systems can encounter different client device capabilities. In addition, applications implemented at client devices are increasing in complexity, such as applications that render artificial reality environments.

Implementations disclosed herein selectively offload visual frames from a client device to an edge system for processing. For example, an edge manager can offload a visual frame to an edge service loaded with a workload resource configured to process the visual frame. Example processing can include object/segment tracking for objects in the visual frames; generative adversarial network ("GAN") processing; augmenting the visual frames with masks, overlays, images, three-dimensional volumes, etc.; artificial reality video processing for the visual frames; three-dimensional mapped environment video processing for the visual frames; or other suitable processing. After the processing, the edge system can return the processed visual frame to the client device. In some implementations, the edge system and client device are situated in a network such that the latency for the offload communication supports real-time video display.

For example, visual frames (e.g., streaming video) can be captured at the client device, offloaded to the edge system, processed by the edge system, returned to the client device, and displayed at the client device, where the capturing of the visual frames and the displaying of the processed frames occurs in real-time. An instance of an edge manager in a cloud system can preload edge systems with workload resources that correspond to data service requests from the client devices. For example, a trained machine learning model (e.g., GAN) that corresponds to a service type can be preloaded at an edge system. This preloaded edge system can then support visual frame offloading when the requested service is the first service type (e.g., GAN processing).

Implementations support edge system discovery for client devices. For example, in order to support real-time functionality, communications between the edge system and the client device can meet certain latency requirements. Edge system discovery can provide a client device identifying information for one or more edge systems with a location proximate to the client device so that these latency requirements can be met. A client device can transmit a request for edge system discovery to a cloud system. For example, the cloud system can maintain a registry of edge systems, locations, and capabilities (e.g., the workload resources stored at the edge systems). Based on the client device's location, the cloud system can return one or more edge systems (and their available processing capabilities and/or preloaded resources) near the client device (e.g., at a location expected to meet a latency criteria for real-time communication).

Implementations of the edge manager can also determine a processing location for an application's processing workload. For example, a first type of service can be selected for visual frames received at a client device. The service selection can be received at an application of the client device that streams captured video frames. In this example, the application can be a streaming video application, an artificial reality application, or any other suitable application that receives a stream of frames and displays a stream of processed frames in real-time. An edge manager (located at the client) can determine a processing location to perform the selected service on the application's visual frames according to one or more of: a client device computing power metric, a client device capacity metric, client device preloaded resources, a service criteria for the selected service, an availability of an edge system with a matching capability (e.g., preloaded workload resource) that meets a criteria for the selected service, a utilization metric for an edge system with a matching capability, latency parameters for edge and/or cloud locations, or any combination thereof.

Example processing locations include on-device, edge location, and cloud location. One or more data services can have a static mapping to an on-device location while other example data services can have a static mapping to a cloud location or an edge location. One or more data services can have a dynamic mapping according to comparison between a criteria for the selected service and one or more metrics for the client system, edge system, and/or cloud system. For example, some data services may relate to data that is private to the user (e.g., visual frames that contain private information or depictions the user may want to keep private), and these data services can have a static on-device mapping. In another example, when a personal edge device is available (e.g., discovered by the client device or connected to the client device), the mapping can be dynamic depending on the availability/capability of the client device and/or the personal edge device to perform the data service.

Given a selected data service with a dynamic mapping, the selected service can be dynamically mapped to a processing location according to one or more mapping rules and/or comparisons. An example comparison can be comparing the client device computing power metric, client device capacity metric, and/or client device preloaded resources to a service criteria for the selected service (e.g., computing power criteria and/or resource criteria). When one or more of these client device metrics/parameters fail to meet the service criteria, the selected service can be mapped to an edge location (or a cloud location).

Another example comparison can be comparing the client device computing power metric, client device capacity metric, and/or client device preloaded resources to a service criteria for the selected service (e.g., computing power criteria and/or resource criteria) and comparing a latency parameter for edge and/or cloud locations to a latency criteria for the selected service. When one or more of these client device metrics/parameters fail to meet the service criteria, and the latency parameters for the cloud location fails to meet the latency criteria, the selected service can be dynamically mapped to the edge location. In another example, when one or more of these client device metrics/parameters fail to meet the service criteria, and the latency parameters for the edge location meets the latency criteria, the selected service can be dynamically mapped to the edge location.

Implementations can perform matching of an edge system to a client device (e.g., requesting a data service) at a cloud system or at the client device. In an example, the client device can match an edge system's capabilities to a client device application's requested service type. A matching edge system can be selected for processing offloaded visual frames. For example, the application can receive captured camera frames and offload the captured camera frames to the selected edge system. The edge system can receive the offloaded camera frames, process the frames using the preloaded workload resources (e.g., a trained machine learning model), and return the processed frames (e.g., rendered frames) to the application at the client device. The application can then display the processed frames to a user such that the receiving of the camera frames and the displaying of the processed camera frames occurs in real-time. In another example, based on the client device's location and the type of service requested by the client device/application, the cloud system can return one or more edge systems near the client device (e.g., at a location expected to meet a latency criteria for real-time communication) that match the requested service type (e.g., preloaded with a workload resources that corresponds to the requested service type). One of these returned edge systems can then be selected for camera frame offload from the application/client device.

Implementations of the edge manager selectively offloads a portion of visual frames received at a client device. For example, an application implemented at the client device can receive a stream of visual frames (e.g., captured camera frames) and a portion of these received visual frames can be selected for offloading. In some implementations, a first camera frame from the stream of camera frames can be compared to a second camera frame from the stream of camera frames to determine a delta, where the second camera frame is captured after the first camera frame. The edge manager can select the second camera frame as part of the portion of camera frames that are offloaded when the delta is above a threshold amount. In some implementations, the portions of camera frames can be selected for offloading by compressing the stream of camera frames received by the application.

After determination of the processing location for the selected service, the edge manager can offload visual frames captured at the client device to a system at the determined location. For example, visual frames received at a client device application can be offloaded to an edge system (e.g., an edge system discovered by the edge manager) and/or a cloud system. The edge and/or cloud system can process the visual frames according to the selected service (e.g., using a preloaded resources corresponding to the selected service) and return the processed frames to the client device. The application can then display the processed frames such that the visual frames are received (e.g., captured) and the processed frames are displayed in real-time. After visual frames are offloaded from a client device and processed visual frames are returned to the client device, implementations of the edge manager can also combine processed visual frames with original visual frames (e.g., visual frames not offloaded). For example, the offloaded camera frames and original camera frames can include a timestamp, and the combining can be achieved by temporally stitching the camera frames together in chronological order according to the timestamps.

Implementations can also distribute workload resources among edge systems and/or cloud systems. For example, the edge manager (e.g., on a cloud system) can track services rendered at client devices, such as data services rendered via performance of a workload on a stream of visual frames. Example tracked data services include object tracking for objects in the visual frames; generating overlays, masks, images, or three-dimensional volumes for augmenting the visual frames; generative adversarial network ("GAN") processing; artificial reality video processing for the visual frames; three-dimensional mapped environment video processing for the visual frames; or other suitable data services.

The edge manager can rank the tracked data services rendered at client devices within a geographic location and distribute workload resources that correspond to the highest ranked tracked data services across the geographic location. For example, the tracked data services can be rendered for one or a set of applications, (e.g., a streaming video application, an artificial reality application, or any other suitable application that receives a stream of frames and displays a stream of processed frames in real-time). A history of data services rendered for the set of applications implemented at client devices within the geographic region can be analyzed to determine a ranking of the popularity of the data services. In some implementations, the ranking can include a timing parameter. For example, at a given time of day during a given day of the week a first ranking of data services can be determined while at another time of day during another day of the week a second ranking of data services (that differs from the first ranking) can be determined.

The edge manager can predict a demand for the tracked data services within the geographic location, and the tracked data services can be ranked according to the predicted demand. For example, usage data (e.g., logs) that include usage patterns for the data services can be analyzed by an analytical model (e.g., machine learning model, or other suitable model) to generate a demand pattern for various of the data services at different times of the day and/or days of the week.

Based on the ranking, the edge manager can select a set of data services and preload edge systems within the geographic region with workload resources (e.g., trained machine learning model, 2D or 3D models and other content items, body kinematic models, or other suitable computing resources) that correspond to the selected data services. Using the preloaded workload resources the edge system can perform the selected data services for applications running at client devices within the geographic region. For example, the preloaded workload resources can configure the edge systems to: a) establish a real-time communication session with client devices, b) receive offloaded visual frames from the client devices, c) process the offloaded visual frames using the preloaded workload resources to perform the selected data services, and d) return the processed visual frames to the client devices for display.

In some implementations, the edge manager can determine a first number of edge systems within the geographic location for a first data service, according to a predicted demand for the first data service, and preload the first number of edge systems within the geographic location with a workload resource that corresponds to the first data service. In another example, the edge manager can determine a first amount of a first workload resource for the geographic location according to a predicted demand for a data service corresponding to the first workload resource, and preload the edge systems within the geographic location with the first amount of the first workload resource.

In some implementations, a quality rating for data services rendered at client devices in the geographic location can be tracked. In an example where a given data service relates to performing a workload on visual frames, a resolution and/or frame rate of the displayed visual frames (after performance of the workload) can be monitored. A quality metric (e.g., resolution, frame rate, user feedback rating, etc.) for the given data service can be compared to a quality criteria (e.g., resolution criteria, frame rate criteria, feedback criteria), and workload resources corresponding to the given data service can be preloaded, distributed, and/or rebalanced based on the comparison. For example, when the quality metric for the given data service fails to meet the criteria, the amount of workload resources corresponding to the given data service and/or the number of edge systems preloaded with the workload resources can be increased.

Some implementations include a client device, an edge device, and/or a cloud device. As used herein, a "device" can be a system or one or more discrete but connected/networked physical components such as a cloud device can include one or more servers working in concert. An edge device can be any device that is capable of meeting a latency criteria when communicating with the client device, such as 20 ms. The edge device can be at a location that is within a threshold distance (e.g., 1, 5, or 50 miles) from the client device, may have a connection capability relative to the client device that meets the latency criteria when a real-time communication session is established, or may otherwise be situated to meet the latency criteria. An edge device can be a network edge device or a personal edge device. For example, a network edge device can be located remote from the client device (e.g., off-premises). In addition, a user may own and/or manage the client device while an external party (e.g., third-party organization) may manage the network edge device. In some situations, a network edge device can be primarily stationary. A connection between the network edge device and the client device can also traverse a mixed network. For example, the connection between the network edge device and the client device may include a wireless communication link (e.g., a Wi-Fi communication link and/or a cellular communication link) and a wired communication link (e.g., backhaul communication fora wireless communication network, wired connections that implement a backbone of the Internet, and the like). In some implementations, the client device and the edge device communicate over a packet switched network that implements Internet Protocol ("IP"). A cloud device can be any device that is remote from the client device (e.g., off-premises) whose communications with the client device generally have a latency that is above the latency criteria, such as between 100 and 150 ms.

A personal edge device can be owned and/or managed by the user. For example, the client device may be a smart display or a wearable device while the personal edge device can be a laptop or desktop. The personal edge device can connect with the client device primarily over a wireless network (e.g., Wi-Fi), via a wireless link (e.g., Bluetooth), or over a network that does not include mixed communication links. In some situations, the personal edge device can be non-stationary.

Implementations support real-time functionality. In an example where visual frames are received at a client device, offloaded to an edge device for processing, returned to the client device after being processed, and displayed at the client device, the receiving of the visual frames and the displaying of the visual frames (after offloading and processing) can occur in real-time. These functions occur in real-time when they occur within a threshold amount of time from one another, such as less than 20 ms.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Conventional software systems can perform data services on visual frames at a client device. However, these software systems often include stringent hardware requirements and consume large quantities of client device computing resources and battery power. Some existing systems offload data services from a client device to a data center, however these systems fail to provide a sufficiently low latency for the communication that supports real-time display of offloaded visual frames, lack the dynamic functionality that performs some data services on-device and offloads others, and generally lack a coordinated set of computing devices (i.e., edge devices) configured to provide a managed set of data services to client devices spread across a geographic location.

Implementations disclosed herein achieve a configuration between a client device and an edge device that supports real-time communication for offloading visual frames (from the client device to the edge device) and receiving, in return, processed visual frames for display. For example, discovery, resource distribution and management, and connection techniques can be implemented to load edge devices with resources that configure the devices to perform data services and to connect client devices that request data services to edge devices with a matching capability. The combination of functionality achieved by some implementations supports a real-time user experience at the client device. For example, visual frames (e.g., camera frames) can be captured at the client device, offloaded to an edge device where a data service workload is performed, returned to the client device, and displayed as streaming video, where the capturing of the visual frames and the display of the streaming video occurs in real-time.

In some situations, a client device may include a limited processing power, limited battery power, or may otherwise be in a state that renders the client device ineffective at performing certain data services. In such a scenario, conventional or existing systems are generally unable to perform data services for visual frames captured at the client device in a manner that achieves a real-time display of the visual frames. Implementations support data services for visual frames received at client devices that lack the hardware capabilities and/or available resource capacity to perform the data services. The implementations disclosed herein, to the contrary, can perform management and coordination of edge devices and selective offloading of the visual frames to an edge device that is able to meet a service criteria, such as a compute criteria for performing the data services and a latency criteria that achieves the real-time display of the visual frames when they are returned to the client device.

Several implementations are discussed below in more detail in reference to the figures. FIG. 1 is a block diagram illustrating an overview of devices on which some implementations of the disclosed technology can operate. The devices can comprise hardware components of a computing system 100 that selectively offload visual frames to an edge device for processing. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, edge manager 164, and other application programs 166. Memory 150 can also include data memory 170 that can include, e.g., software components (e.g., workload resources), usage data, demand data, historic logs, edge registry data, client, edge, and/or cloud metric data, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
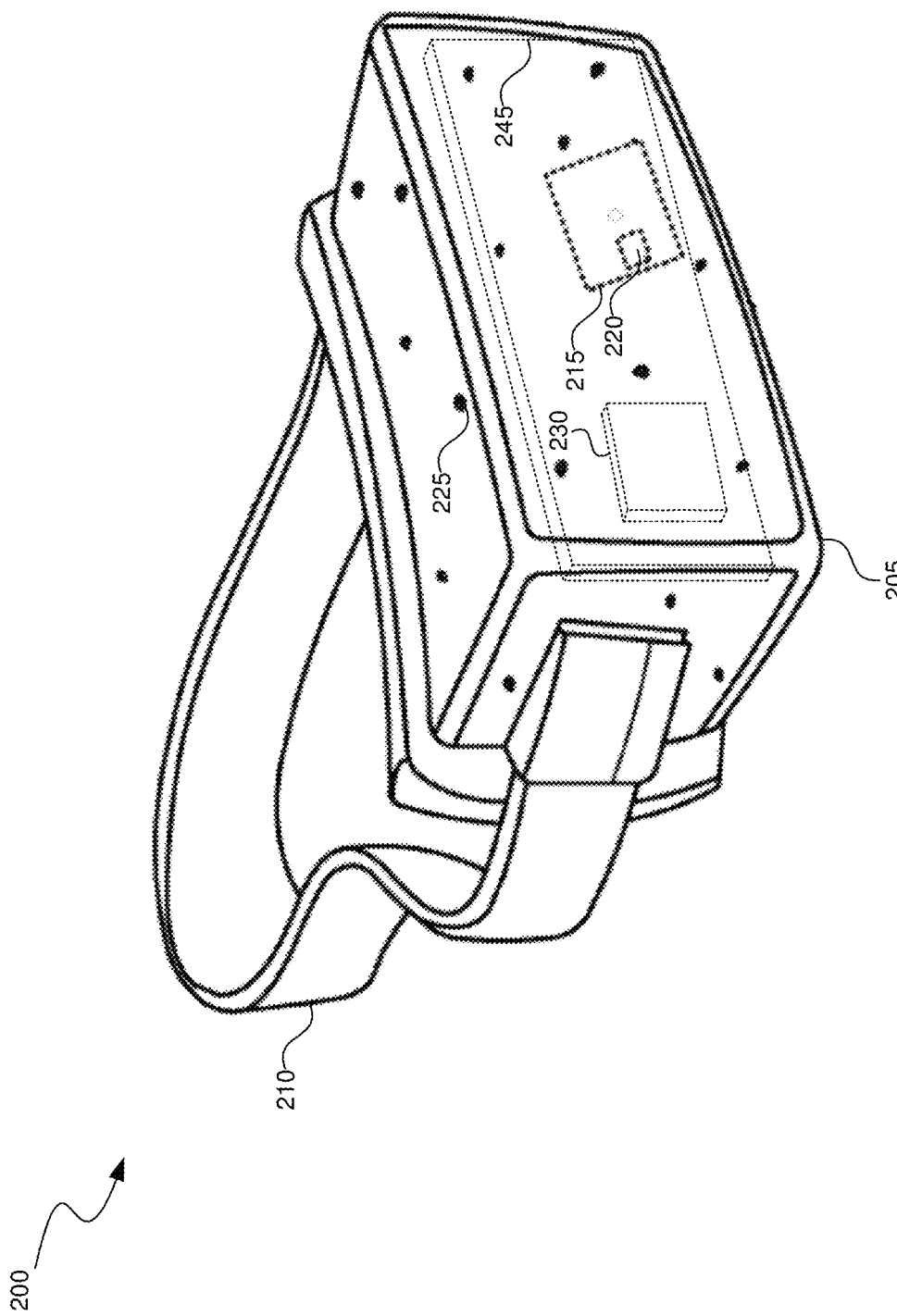
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in an artificial reality environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
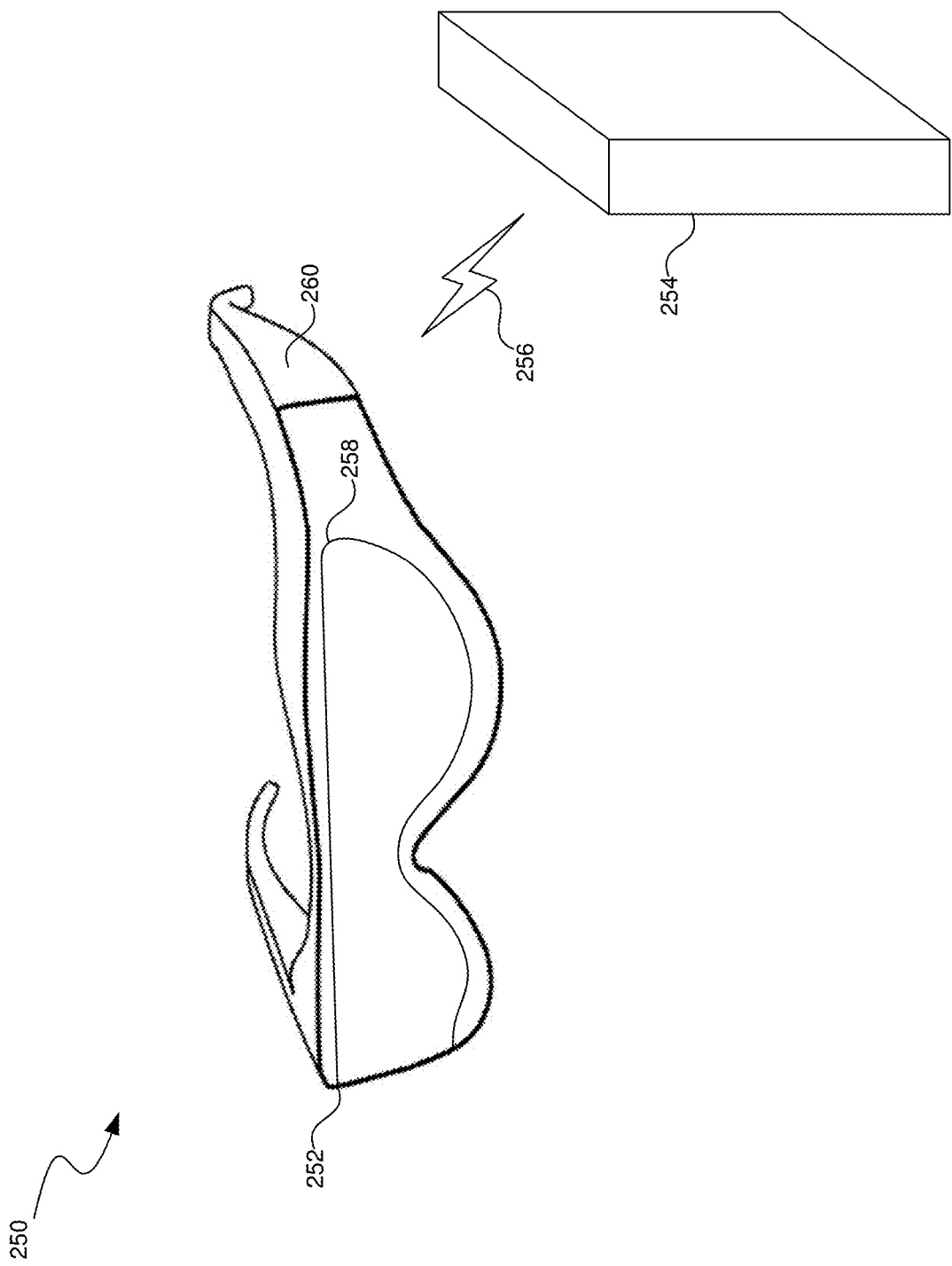
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
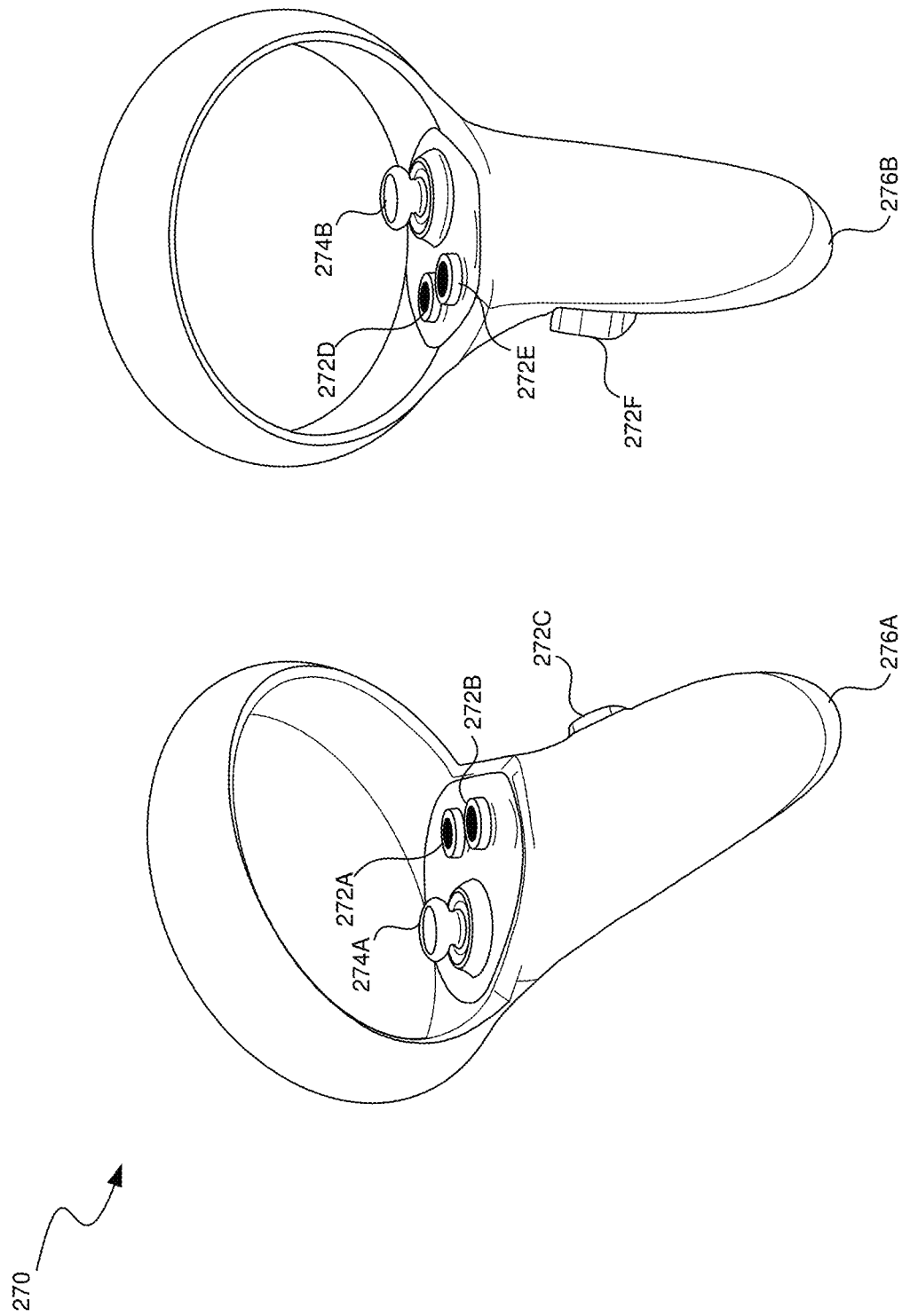
FIG. 2C is a wire diagram illustrating controllers which, in some implementations, a user can hold in one or both hands to interact with an artificial reality environment.

FIG. 2C illustrates controllers 270 (including controller 276A and 276B), which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. As another example, one or more light sources can illuminate either or both of the user's eyes and the HMD 200 or 250 can use eye-facing cameras to capture a reflection of this light to determine eye position (e.g., based on set of reflections around the user's cornea), modeling the user's eye and determining a gaze direction.

Figure 3:
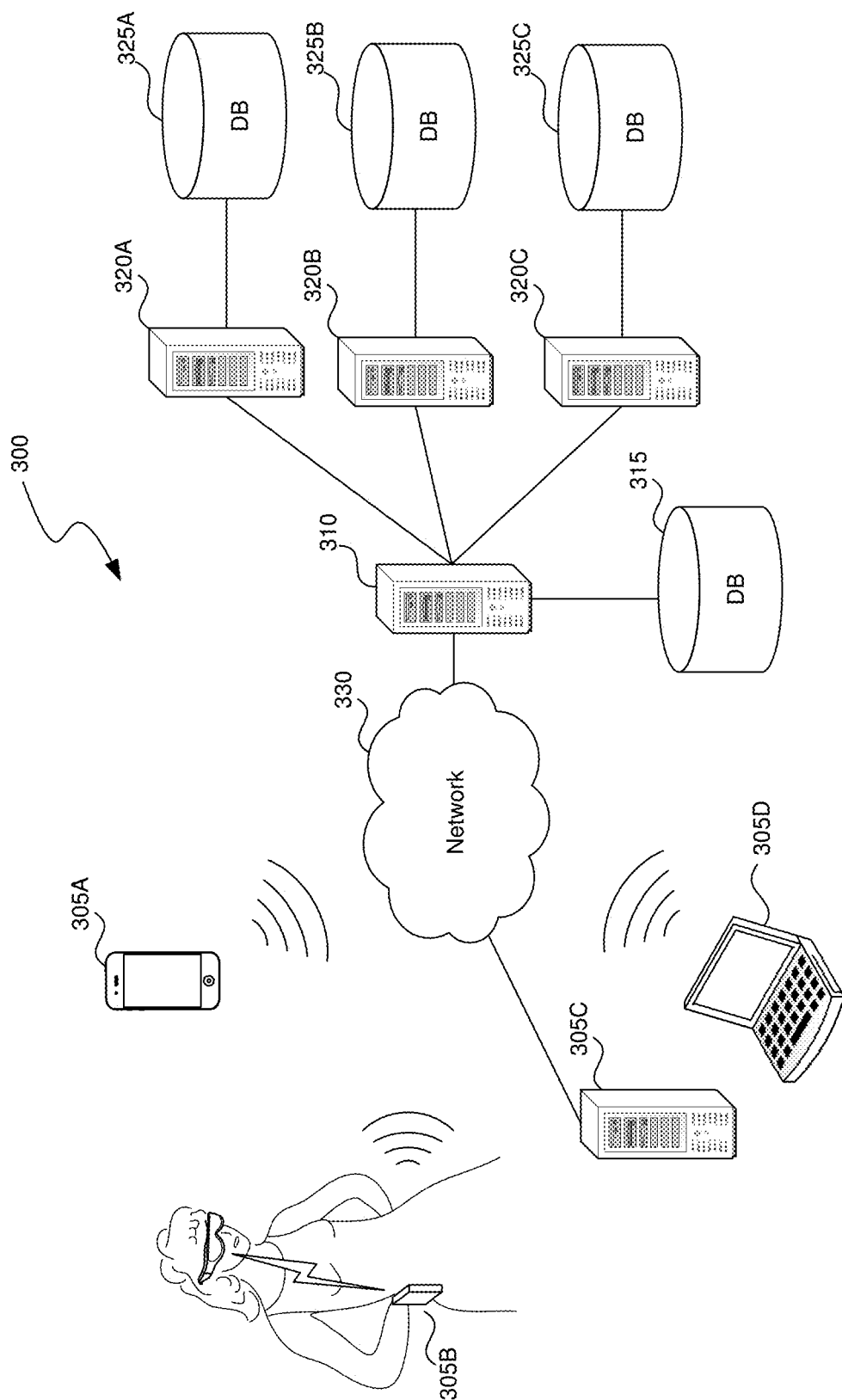
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
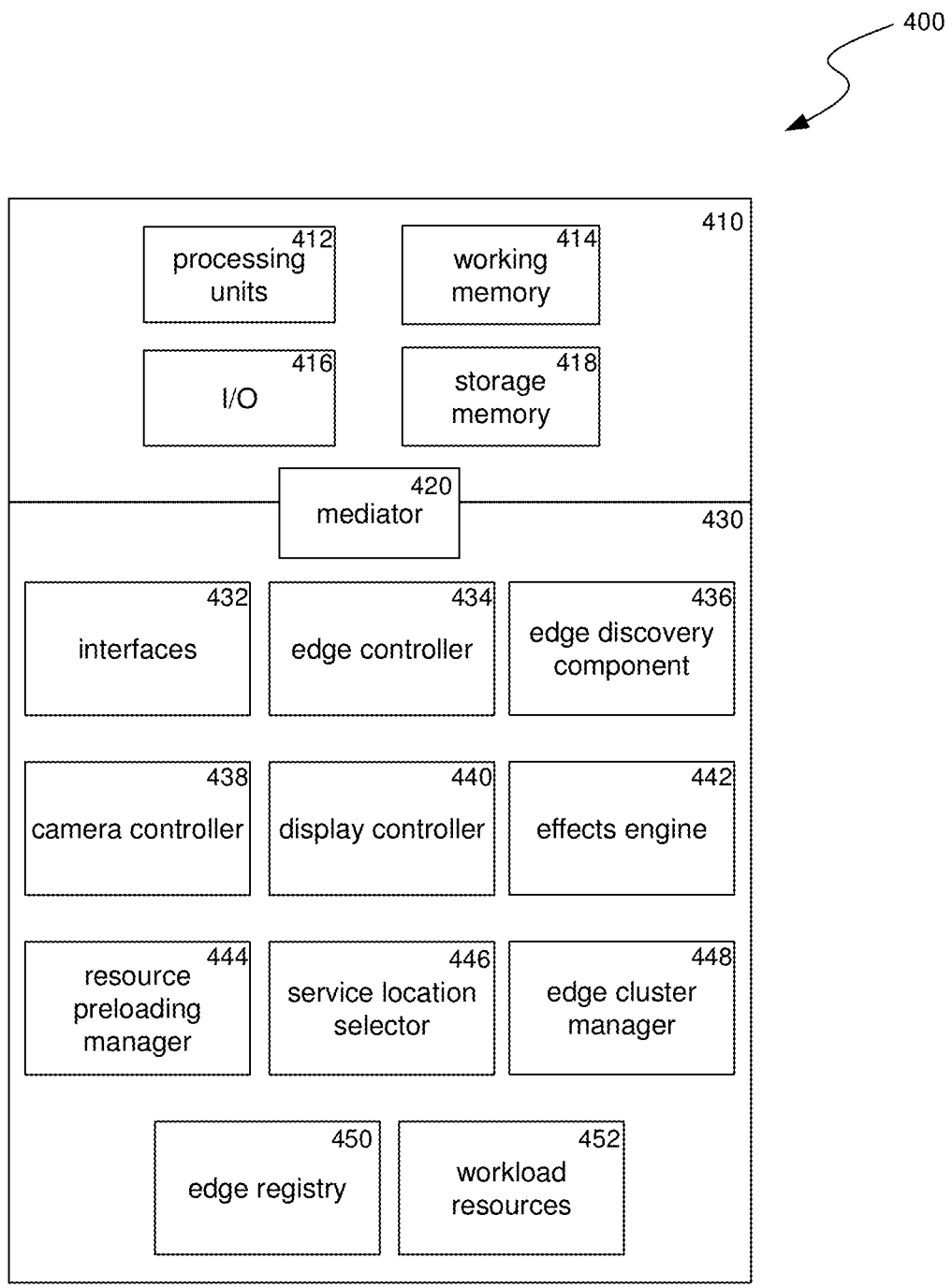
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for selectively offloading visual frames to an edge device for processing. Specialized components 430 can include edge controller 434, edge discovery component 436, camera controller 438, display controller 440, effects engine 442, resource preloading manager 444, service location selector 446, edge cluster manager 448, edge registry 450, workload resources 452, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

Edge controller 434 manages the deployment and operation of edge systems that process offloaded visual frames. Implementations of edge controller 434 can run at client systems, edge systems, and/or cloud systems. For example, an edge controller 434 running in a cloud system can initialize data services (e.g., transmit software and resources) at an edge service (e.g., edge device with computing hardware) such that the edge systems are configured to perform data services on offloaded visual frames. For example, edge controller 434 can deploy, to an edge service, software that configures the edge service to perform one or more of the data services (e.g., effects engine 442 and/or any other suitable software). In addition, edge controller 434 can select data services for one or more edge system (e.g., edge systems in a given geographic location), and, in combination with resource preloading manager 444, preload edge system with resources for performing the computing workloads that correspond to these selected data services, such as workload resources 452. Example data services can include object tracking for objects in the visual frames, generating overlays, masks, images, or three-dimensional volumes for augmenting the visual frames, artificial reality video processing for the processed visual frames, three-dimensional mapped environment video processing for the processed visual frames, generative adversarial network ("GAN") processing, and any other suitable data service for processing offloaded visual frames.

Implementations of edge controller 434 track the data services running in a geographic location. For example, the geographic location can be a predetermined geographic region, a grouping of edge systems that correspond to a mapped coverage region, a dynamic geographic region, a portion of a city, county, or other known geographic location, or any other suitable geographic location. An edge controller 434 that tracks the data services running in a geographic location may run in a cloud system, or in any other suitable location.

Edge controller 434 can track the usage of data services performed by the edge systems in the geographic location (e.g., performed on offloaded visual frames). For example, edge systems/devices within the geographic location may store usage information (e.g., logs with timing information, frequency information, and other suitable usage information) of the data services performed at each edge system/device, and the usage information can be accessed to track the data services performed in a geographic location. In another example, client systems/devices may store usage information about requested/selected data services, and the usage information can be accessed to track the data services performed in a geographic location. In some implementations, the tracked data services can relate to one or more applications (e.g., applications running on the client systems).

Edge controller 434 can also rank these tracked data services. Example rankings include ranking data services by a usage metric, a user value metric, a priority metric, a predicted demand, a quality metric, any other suitable metric, or any combination thereof. The data services can be ranked in ascending or descending order.

In an example, the user value metric can combine a data service's usage metric with a resource consumption metric for the data service. For example, some data services may consume client device resources at a higher rate than other data services. The resource consumption metric can reflect a data service's power consumption, processor utilization, storage requirements, and other suitable client device resource consumption parameters. The usage for a data service and the data service's resource metric can then be combined (e.g., summed, averaged, weighted average, etc.) to generate the user value metric. A ranking according to the user value metric can balance the usage of a data service with the burden that the data service puts on a client device.

In another example, the priority metric can represent a priority for data services, such as a priority different from popularity and/or client device resource consumption. In some implementations, a dynamic may exist between a given data service and a new or present circumstance, such as the release of a new application for one or more client devices, the release of a new client device or client device type, or any other suitable circumstance. The new or present circumstance may put an incentive on the given data service that is not reflected in its past usage or its client device resource consumption. Accordingly, the tracked data services can be assigned a priority metric (e.g., binary, such as high or low priority, numeric, such as first, second, third, fourth, etc., and the like) and ranked according to the priority metric or a combination of the priority metric and other suitable metrics.

Implementations of edge controller 434 can also predict a demand for one or more of the tracked data services and rank the data services according to the predicted demand. For example, usage data (e.g., logs) for the performed data services can be stored by client systems and/or edge systems. The usage data can include identifiers for data services performed, timing (e.g., time of day and day of week), duration of usage, and other suitable information. The usage data can be analyzed by an analytical model (e.g., machine learning model, or other suitable model) to predict a demand pattern for the data services. For example, the demand pattern can predict a demand for a given data service at different times of the day and days of the week. Based on the predicted demand pattern and a given timing of day, the data services can be ranked according to the predicted demand at the given time of day. The data services can be reranked at a second time of the day according to the predicted demand pattern values at the second time of day.

Implementations of edge controller 434 can also track a quality metric for data services rendered at client devices in the geographic location. In an example where a given data service relates to performing a workload on visual frames, a resolution and/or frame rate of the displayed visual frames (after performance of the workload) can be tracked by the displaying client system/device. In another example, feedback can be received about the quality of the displayed visual frames (after performance of the workload). The quality metric for a tracked data service can be the tracked resolution (e.g., average or median resolution), frame rate (e.g., average or median frame rate), feedback (e.g., average of user reported quality), or any combination thereof.

Using the ranking and any other suitable criteria, edge controller 434 can select data services for deployment in the geographic location and/or rebalance deployed data services in the geographic location. The data services selected for deployment/rebalancing can include a subset of the highest ranked data services, or any other suitable set of data services. Resource preloading manager 444 can access the selection of data services for the geographic region and preload workload resources 452 corresponding to the selected services across edge systems located in the geographic region.

Implementations of edge controller 434 can also run at a client system. For example, at a client system edge controller 434 can be used to establish a communication session with an edge system, such as a real-time communication session (e.g., webRTC session, or other suitable real-time communication sessions). The established communication session can be used to offload visual frames (received at the client system) to the edge system and receive back processed frames from the edge system to the client system, where the client system can then display the processed frames (e.g., to a user as streaming video). The edge system may perform data services on the visual frames prior to transmitting them back to the client system. The real-time communication session can support a latency for the round trip of the offloaded visual frames such that the receiving of the visual frames at the client system (e.g., capturing of the frames with a camera) and the displaying of the processed frames (offloaded to and returned by the edge system) occurs in real-time. Edge controller 434 can terminate the communication session with the edge system, such as when the data service provided by the edge system has not been requested for a threshold amount of time or in response to a selection (e.g., user selection or selection by a software application) to no longer user the data service.

Edge controller 434 running at a client system can select an edge service to perform data services according to a requested/selected data service type. For example, client device can match an edge system's capabilities to a client device application's requested service type. Implementations of edge discovery component 436 can provide a client system a listing of proximate edge systems, an address (e.g., network address) for the edge systems, locations of the edge systems, and the data services (e.g., workload resources) loaded onto the edge systems.

Edge controller 434 can match the requested data service type to the functionality (e.g., correspond workload resources) of one or more discovered edge systems. In addition, edge controller 434 can also match a latency criteria for the requested data service to a predicted latency for one or more discovered edge systems. For example, based on the client system's location and the discovered locations of the edge systems, a latency can be predicted for the discovered edge systems. An edge system with loaded functionality that matches the requested data service type and that has a predicated latency that meets the latency criteria for the data service type can be selected for the requested data service. Edge controller 434 can initiate a real-time communication session with the selected edge system.

Edge discovery component 436 can discover edge systems proximate in location to one or more user systems/devices. For example, edge discovery component 436 can run at a cloud system and/or at a user device. Implementations of edge discovery component 436 running at a cloud system can track the locations of edge systems, the functionality loaded onto the edge systems (e.g., workload resources), computing ability or current available resources of the edge systems, the network addresses for edge systems, and any other suitable information. For example, the edge system information tracked and stored by edge discovery component 436 (running at a cloud system) can be stored at edge registry 450. Edge registry 450 can be periodically updated to update locations, functionality, and network addresses for the edge systems.

Implementations of edge discovery component 436 running at a client system can discover proximate edge systems by transmitting a request to a cloud system (e.g., edge discovery component 436 running in the cloud) and receiving a listing of proximate edge systems in return, including the edge system's loaded functionality (e.g., workload resources), compute ability, current capacity, locations, and network addresses. For example, implementations of edge discovery component 436 running at the cloud system can, in response to the request and using the client system location, return information from edge registry 450 for edge systems proximate to the client system's location.

Camera controller 438 can capture visual frames at a user device and select visual frames to offload to an edge service or cloud service. For example, camera controller 438 can receive visual frames from a device (e.g., video camera) and select one or more frames for offloading. In some implementations, a frame rate for the received frames can be reduced, a portion of the received frames can be discarded in view of the reduced framerate, and a subset of the received frames (e.g., frames that are not discarded) can be selected for offloading. In another example, a resolution for the received frames can be reduced, and a subset of the received frames can be selected for offloading based on the reduced resolution. The received frames may include a timestamp indicating when the frame was received/captured.

Implementations of camera controller 438 can also compare adjacent frames to one another to omit one or more frames from offloading, for example, when a delta between adjacent frames is less than a threshold. Camera controller 438 can compare a first frame to a second frame to generate a delta, where the second frames is after the first frame in time. The delta can represent a difference between the first frame and the second frame, and the delta can be calculated using pixel values for the frames. The delta can be compared to a criteria (e.g., threshold difference). When the generated delta is small in value, it can indicate that the second frame provides little to no new information relative to the first frame. When the generated delta is large in value, it can indicate that the second frame provides information different from the first frame (e.g., new information). Accordingly, when the delta fails to meet a threshold difference, the second frame can be omitted from the selection of frames to be offloaded. In this example, a first frame and a third frame (after the second frame in time) can be selected for offloading, while the second frame is omitted from the selection.

Display controller 440 can display processed visual frames at a client system/device. For example, visual frames can be received at a client system (e.g., received at camera controller 438) and a selection of the frames can be offloaded to an edge system or a cloud system for processing. The processed frames can be returned to the client system and display controller 440 can display the processed frames as streaming video.

In some implementations, display controller 440 combines processed visual frames received from an external device (e.g., frames offloaded and processed by a cloud or edge device) with original visual frames (e.g., frames that have not been offloaded). For example, given a first, second, and third frame, the first and third frame can be offloaded for processing while the second frame is not offloaded for processing. After the first and third frames are offloaded and the processed first and third frames are received, display controller 440 may stream the first, second, and third frames in order, for example based on timestamps for the frames.

Effects engine 442 can be software that process visual frames. For example, effects engine 442 can, when configured with one or more workload resources 452, track objects/segments in the visual frames, generate overlays, masks, images, or three-dimensional volumes for augmenting the visual frames, perform artificial reality video processing for the visual frames, perform three-dimensional mapped environment video processing for the visual frames, perform generative adversarial network ("GAN") processing on the visual frames, and/or perform any other suitable processing on visual frames. An implementation of effects engine 442 can include components of Spark AR engine, Spark AR Studio, or any other suitable effects engine.

Resource preloading manager 444 can preload workload resources 452 at edge system according to instructions from edge controller 434. For example, edge controller 434 can select a subset of data services for edge systems in a geographic location, and resource preloading manager 444 can preload workload resources 452 that correspond to the selected data services at these edge systems.

In some implementations, resource preloading manager 444 preloads the workload resources 452 across the geographic region such that a given workload resource 452 (which corresponds to a selected data service) is spread across the geographic region. For example, resource preloading manager 444 can access edge registry 450 and retrieve the locations of edge systems in the geographic location. To distribute a given workload resource 452 across the geographic region, resource preloading manager 444 can select a first edge system for preloading with the given workload resource 452. Resource preloading manager 444 can then select a second edge system for preloading with the given workload resource 452 that is at least a first threshold distance from the first edge system. While distributing the given workload resource 452, resource preloading manager 444 can track the edge systems preloaded and continue selecting edge systems at least the first threshold distance away from edge systems already preloaded with the given workload resource 452.

In some examples, resource preloading manager 444 may encounter a scenario where no additional edge systems are available in the geographic region that are at least a threshold distance from an edge system already preloaded with the given workload resource 452. In some implementations, the first threshold distance may be reduced so that resource preloading manager 444 can continue preloading the given resource at edge systems in the geographic location. In another implementation, resource preloading manager 444 may terminate preloading the given workload resource 452 when no additional edge systems at least the first threshold distance from already preloaded edge systems can be located.

In some implementations, edge controller 434 can select a number of edge systems to be preloaded with a given workload resource 352 and/or select a quantity of a given workload resource 352 for preloading in a geographic location. In this example, resource preloading manager 444 can preload the number of edge systems with the given workload resource 352 and/or preload the quantity of the given workload resource 352 across the geographic region.

Service location selector 446 can select a processing location for a data service. For example, service location selector 446 can be implemented at a client system that runs an application (e.g., streaming video, XR environment, and the like), and one or more data services can be selected using/requested by the application. Service location selector 446 can select a processing location for the selected/requested data service, such as on-device (e.g., at the client system), edge system, or cloud system.

In some implementations, service location selector 446 selects a location for the data service using one or more of client system utilization, discovered edge systems and their loaded resources, criteria for the data service, or any combination thereof. For example, service location selector 446 can determine a processing location to perform the selected data service according to one or more of: a client system computing power metric, a client system capacity metric, client system preloaded resources, a service criteria for the selected service, an availability of an edge system with a matching capability (e.g., preloaded workload resource) that meets a criteria for the selected service, a utilization metric for an edge system with a matching capability, latency parameters for edge and/or cloud locations, or any combination thereof.

The selected/requested data service can include one or more criteria for performing the data service. Example criteria can include a resource criteria for performing the data service (e.g., one of workload resources 452), a latency criteria (e.g., 10 milliseconds, 20 milliseconds, 30 milliseconds, and the like), a processing power criteria (e.g., threshold on-device processing power), and other suitable criteria. In some implementations, a comparison between the criteria for one or more data services can be compared to the metrics for a client system to generate a mapping for the data services.

Example metrics for the client system include a processing power metric for the client system (e.g., combination of speed, number of cores, cache memory, graphical card—GPU—or other video processing hardware, and other suitable parameters that reflect the processing power of a device), a client system capacity metric (e.g., processor utilization, memory utilization, and the like), client system preloaded resources (e.g., workload resources 452), and other suitable metrics. In some implementations, service location selector 446 compares the criteria for the selected/ requested data service to the metrics for the client system to dynamically map the location of the data service.

An example comparison can be comparing the client device computing power metric and/or client device preloaded resources to the processing power criteria and resource criteria of the requested/selected data service. When the client system metrics meet the data service criteria the determined processing location can be dynamically mapped to on-device, and when the client system metrics fail meet the data service criteria the determined processing location can be dynamically mapped to an edge location (or a cloud location).

In some implementations, when the client system metrics meet the data service criteria an additional comparison can be performed that compares the processing power criteria to a utilization metric for the client system (e.g., processor utilization, memory utilization, and the like). For example, a processing power criteria that reflects a high resource spend for performing the data services may be incompatible with an on-device mapping when the utilization metric for the client systems indicates that computing resources may not be available. In this example, the processing power criteria can be translated to a predicted client system utilization, and when the utilization metric fails to meet the predicted client system utilization, the data services can be dynamically mapped to an edge location or a cloud location.

In some implementations, when a data service is not mapped to an on-device processing location, the mapping can be an edge system or a cloud system. Service location selector 446 can determine a processing location that is something other than an on-device mapping according to latency criteria for the selected/requested data service, edge system resources, and/or edge system utilization. The edge systems discovered by a client system can each have a predicted latency based on their relative locations to the client system. A cloud system can similarly include a predicted latency metric (e.g., based on tracked communications to and from the cloud system, such as the communication related to edge system discovery).

When it is determined that frames needing a data service are to be offloaded, service location selector 446 can compare preloaded resource at discovered edge systems (e.g., workload resources 452) to the resource criteria for a requested/selected data service. The discovered edge services with one or more preloaded resources that match the data service resource criteria can be shortlisted. The predicted latency metrics for these shortlisted edge systems can then be compared to the latency criteria for the data services. When at least one edge system has a predicted latency metric that meets the latency criteria, the data service can be dynamically mapped to an edge location. In some implementations, the edge system with the predicted latency metric that met the criteria can be selected for the data service.

In some implementations, service location selector 446 can compare the latency criteria for a selected/requested data service to the predicted latency metric for the cloud system. When the predicted latency for the cloud system meets the latency criteria, the data service can be dynamically mapped to the cloud location. In this example, a mapping to the cloud location can take priority over a mapping to an edge location. When the latency criteria for a data service permits processing in the cloud, this mapping can take precedence over a mapping to an edge location because computing resources may be limited at edge systems. Once a data service is mapped by service location selector 446, edge controller 434 can offload visual frames to the mapped location.

Edge cluster manager 448 can serve as a manager for a cluster of edge computing devices. An example edge system can include two edge devices and an edge cluster manager 448. Edge cluster manager 448 can distribute edge traffic (e.g., offloaded visual frames) to the two edge devices within the edge system. For example, the two edge devices can be loaded with some overlapping workload resources 452 and some distinct workload resources 452. Based on a utilization metric for the edge devices, edge cluster manager 448 can route requests for data services to an edge device with a preloaded workload resource 452 that corresponds to the data service request and a utilization metric below a threshold.

Edge cluster manager 448 can also manage interactions for the edge system and the cloud system. For example, edge cluster manager 448 can connect with the cloud system to register and update edge registry 450, report data service usage, receive/retrieve preloaded workload resources 452, and perform other suitable edge system to cloud system communications.

Workload resources 452 can be resources that configure software (e.g., effects engine 442) to process visual frames. In an example, workload resources 452 can be a trained machine learning model configured to perform a workload on a visual frame, various 2D or 3D models, audio content, kinematic models, mapping or location data (e.g., SLAM data), etc. An example workload resource 452 can be a trained GAN configured to process visual frames and generate a visual augment. Other workload resources 452 can be trained and/or configured to: track objects in the visual frames, generate overlays, masks, images, or three-dimensional volumes for augmenting the visual frames, perform artificial reality video processing for the visual frames, perform three-dimensional mapped environment video processing for the visual frames, and any other suitable data service for processing offloaded visual frames. Workload resources 452 can be any other suitable resource (e.g., model, software, etc.) for performing a workload on streaming visual frames. Workload resources 452 can be preloaded to edge systems and/or client systems such that a workload can be performed on visual frames by an engine (e.g., effects engine 442) using the preloaded resources.

A "machine learning model," as used herein, refers to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of a service being used a given a location or set of users based on an analysis of previous user service selections. Examples of models include: neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, a demand prediction model can be a neural network with multiple input nodes that receive data service usage data and timing information as input. The input nodes can correspond to functions that receive the input and produce results. These results can be provided to one or more levels of intermediate nodes that each produce further results based on a combination of lower level node results. A weighting factor can be applied to the output of each node before the result is passed to the next layer node. At a final layer, ("the output layer,") one or more nodes can produce a value for the input that, once the model is trained, can be used as a predicted demand model for data services. In some implementations, such neural networks, known as deep neural networks, can have multiple layers of intermediate nodes with different configurations, can be a combination of models that receive different parts of the input and/or input from other parts of the deep neural network, or are convolutions or recurrent—partially using output from previous iterations of applying the model as further input to produce results for the current input.

Workload resources 452 of FIG. 4 can be trained machine learning models. For example, a generative adversarial network can be trained to generate augments for visual frames. An example GAN can include two neural networks, a generator and a discriminator. In training, a GAN's generator is trained to fool the GAN's discriminator. A GAN can be trained using a variety of techniques, including unsupervised learning, semi-supervised learning, fully supervised learning, and/or reinforcement learning. Other workload resources 452 can be other types of machine learning models trained to track objects/segments in visual frames, and perform other suitable processing on visual frames. For example, workload resources 452 can include convolutional neural networks, deep convolutional neural networks, very deep convolutional neural networks, transformer networks, encoders and decoders, and other suitable machine learning components.

Some machine learning models can be trained with supervised learning. For example, a convolutional neural network can be trained to detect and track object in streaming video. The training data can include visual frames as input and a desired output, such as object boundary labels (e.g., bounding boxes). An instance of training data, such as a visual frame, can be provided to the model. Output from the model can be compared to the desired output for that visual frame and, based on the comparison, the model can be modified, such as by changing weights between nodes of the neural network or parameters of the functions used at each node in the neural network (e.g., applying a loss function). After applying the visual frames and labels in the training data and modifying the model in this manner, the model can be trained to track objects.

Implementations offload visual frames from a client system to an edge system (or a cloud system) for performance of a workload such that a data service's criteria (e.g., latency criteria) is met. For example, visual frames can be captured at a client system using a camera, offloaded to an edge system for augmentation, returned to the client system after augmentation, and displayed as streaming video on the client system. In this example, the communication between the client system and edge system can meet latency criteria so that the capturing of the visual frames and displaying of the augmented visual frames occurs in real-time. To achieve this functionality, a client system, edge system, and cloud system can discover edge services, preload workload resources, determine a processing location for data services, select visual frames for offloading, combine visual frames for displaying, track data services, rebalance workload resources, and perform other functionality to support the performance of a workload on visual frames offloaded from a client system.

Figure 5:
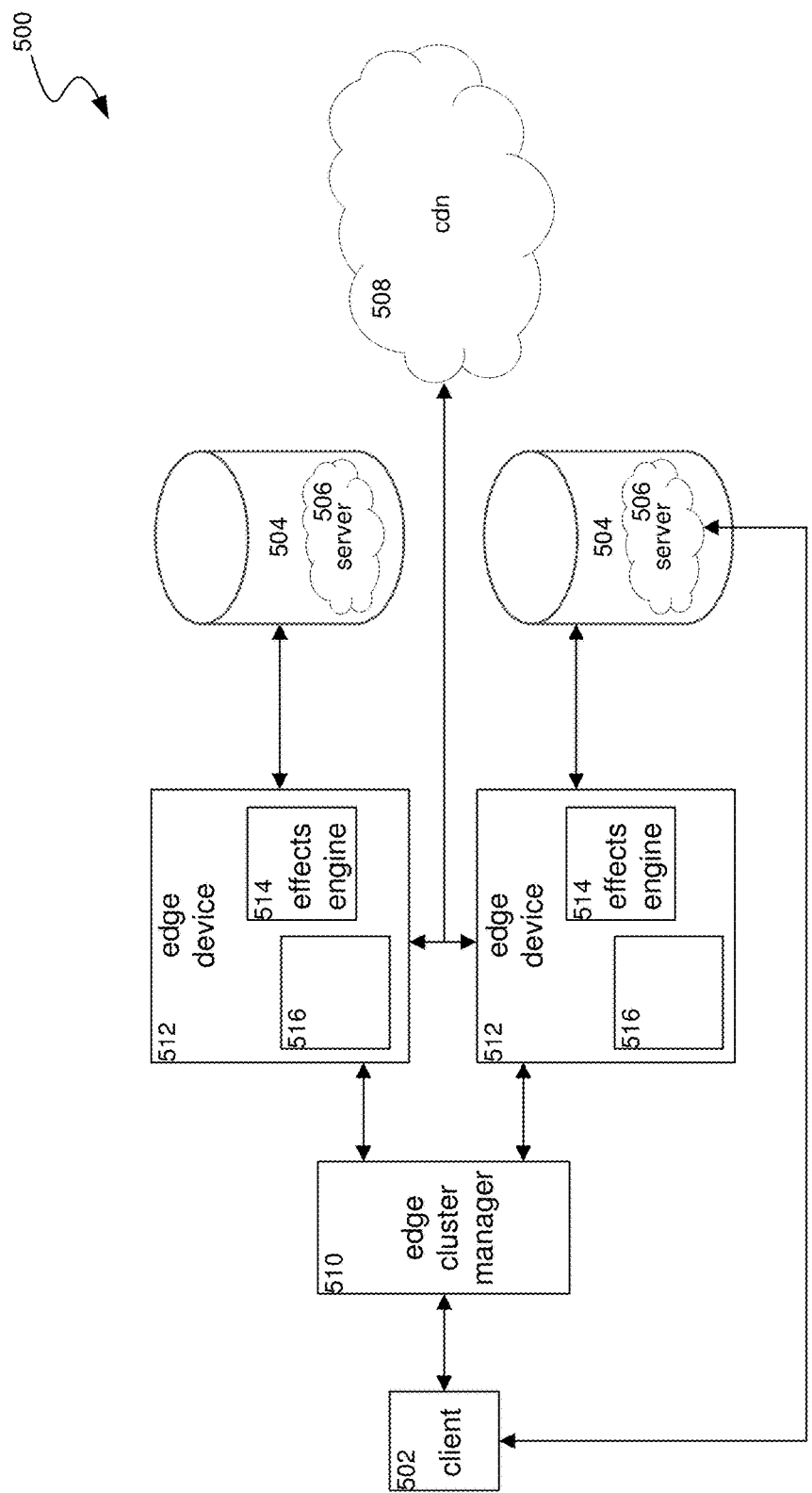
FIG. 5 is a system diagrams illustrating components for selectively offloading visual frames to an edge system for processing.

FIG. 5 is a system diagram illustrating components for selectively offloading visual frames to an edge system for processing. System 500 includes client 502, data centers 504, servers 506, content delivery network 508, edge cluster manager 510, edge devices 512, effects engine 514, and workload resources 516.

Client 502 can be a smartphone or tablet, smart speaker/ smart display, a wearable device with a display, an artificial reality device, or any other suitable client device or system. Client 502 can represent client devices with a wide range of processing power. For example, a smartphone can have higher levels of processing power than a smart speaker or wearable device. Edge systems, such as edge cluster manager 510 and edge devices 512, can be used to provide high computing functionality to different types of clients 502 with edge offloading.

Client 502 first communicates with servers 506 at data centers 504 to connect to a cloud system. For example, client 502 can authenticate with servers 506 (e.g., using a world wide web ("WWW") protocol). Servers 506 can provide client 502 with a graphQL endpoint and return a session description protocol ("SDP") offer and server task information that client 502 can use to connect to edge cluster manager 510/edge devices 512 (e.g., for offloading streaming visual frames). Servers 506 can send the connection information (e.g., IP/port) to client 502 in any suitable manner that permits client 502 to establish a communication session with edge cluster manager 510.

Edge cluster manager 510 and edge devices 512 can be point of presence ("PoP") devices located proximate to users, such as wireless device users. In the illustrated example, client 502 is proximate to edge cluster manager 510/edge devices 512 such that a latency for communication with edge devices 512 (e.g., between 15-40 milliseconds) is lower than a latency for communication with data centers 504 (e.g., between 90-150 milliseconds).

After client 502 discovers connection information for edge cluster manager 510 (from servers 506), client 502 can initiate a real-time communication session (e.g., webRTC session) with edge cluster manager 510 and offload visual frames (e.g., camera frames) to edge cluster manager 510/ edge devices 512. Edge devices 512 can be initialized with effects engines 514 (similar to effects engine 442 of FIG. 4) and workload resources 516 (similar to workload resources 452 of FIG. 4). For example, edge cluster manager 510 can receive workload resources 516 from content delivery network ("CDN") 508 and preload edge devices 512 with the workload resources. In another example, an edge manager at servers 506 can preload edge cluster manager 510/edge devices 512 with workload resources 516.

Edge cluster manager 510 can receive offloaded visual frames from client 502 over the established real-time communication session and route the visual frames to one of edge devices 512. The edge device 512 routed the offloaded visual frames can perform a workload (e.g., a requested data service) on the visual frames using effects engine 514 and workload resources 516. The processed visual frames can then be returned to client 502 over the established communication channel for display at client 502. The visual frames offloaded from client 502 can be streamed to edge cluster manager 510/edge devices 512 and the processed visual frames can be streamed to client 502 over the real-time communication session. Implementations of client 502 and edge devices 512 are located in close proximity to one another such that the capturing of visual frames a client 502 and the displaying of the processed visual frames (e.g., offloaded to edge devices 512) occurs in real-time.

Figure 6A:
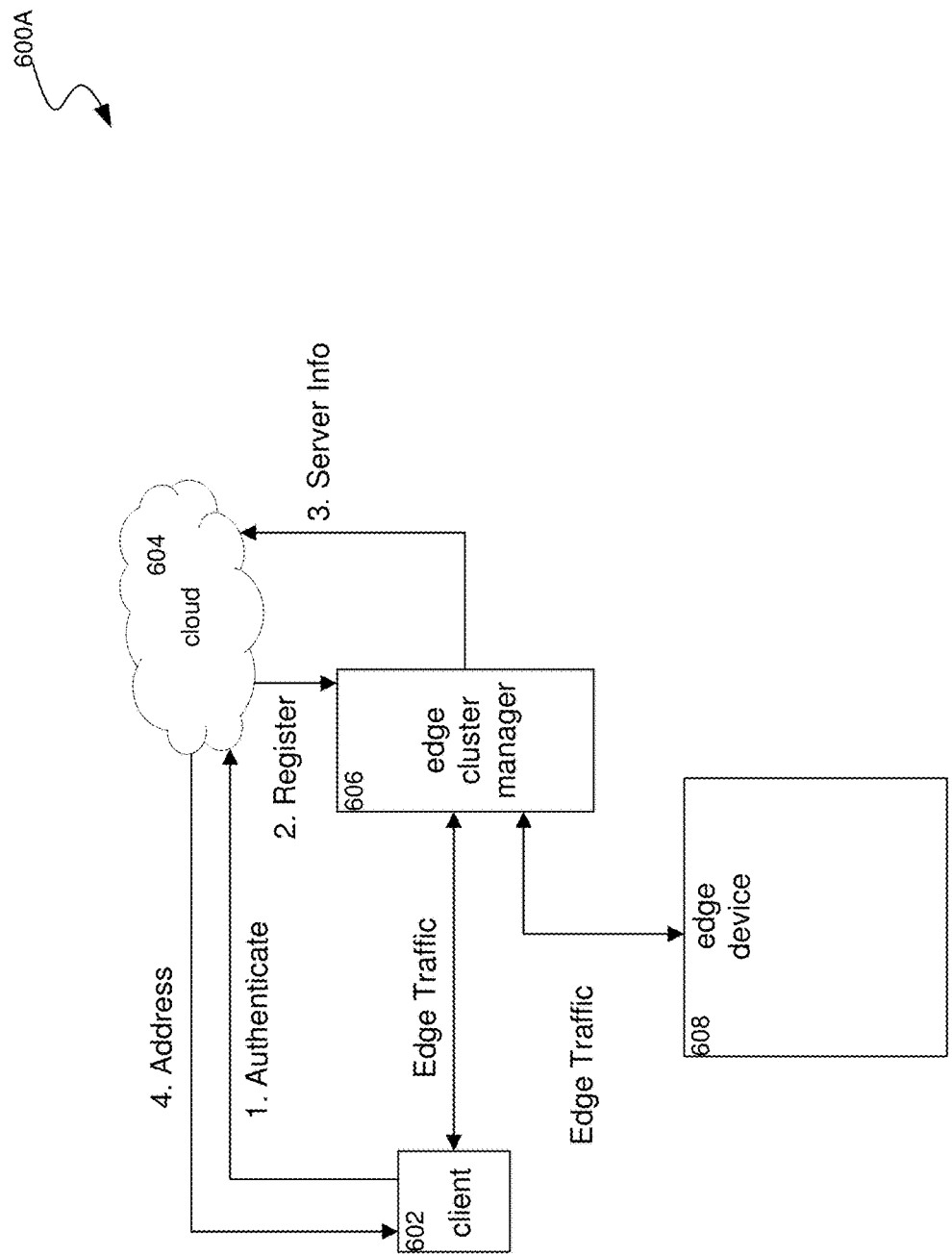
FIGS. 6A and 6B are system diagrams illustrating components for discovery edge services and preloading edge devices with workload resources to support client device offloading.
Figure 6B:
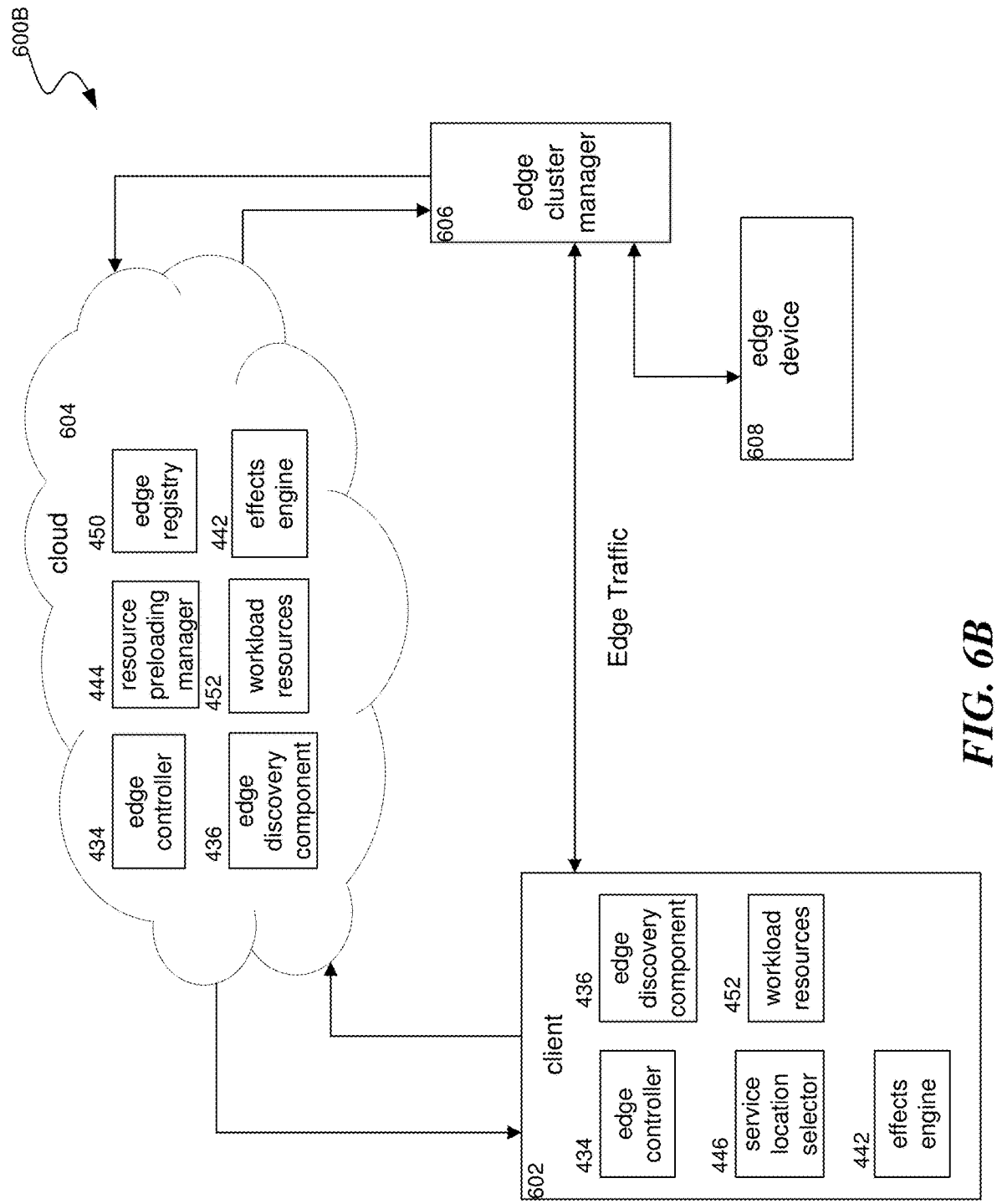

FIGS. 6A-6B are system diagrams illustrating components for discovery edge services and preloading edge devices with workload resources to support client device offloading. System 600A illustrates an example set of communications for configuring visual frame offload from a client system. System 600A includes client 602, cloud system 604, edge cluster manager 606, and edge device 608.

Client 602 can authenticate with cloud 604. Any suitable authentication communications, protocols, and/or credentials can be implemented. Cloud 604 can communicate with edge cluster manager 606 to register the edge system (e.g., within an edge registry). Edge cluster manager 606 can provide server information, such as a network address for the edge system. Cloud 604 can provide an address for edge cluster manager 606 (e.g., Traversal Using Relays Around NAT ("TURN") address). Client 602 can then establish a real-time communication session with edge cluster manager 606/edge device 608 using the received network address. While system 600A illustrates a sequence of communications for edge system registration, discovery, and usage, any other suitable communications, sequence, and/or protocol can be implemented.

System 600B illustrates components for preloading edge devices with workload resources to support client device offloading. System 600B includes client 602, cloud system 604, edge cluster manager 606, and edge device 608. Client 602 includes edge controller 434, edge discovery component 436, service location selector 446, effects engine 442, and workload resources 452 of FIG. 4. Cloud 604 includes edge controller 434, edge discovery component 436, resources preloading manager 444, workload resources 452, edge registry 450, and effects engine 442 of FIG. 4.

Cloud 605 can communicate with client 602 to support discovery of edge systems (e.g., edge cluster manager 606/edge device 608), preload workload resources 452 across edge systems and/or client systems, and receive offloaded visual frames for processing (using effects engine 442 and workload resources 452). For example, edge discovery component 436 at client 602 can transmit a request for edge systems proximate to client 602's location to cloud 604.

Edge discovery component 436 at cloud 604 can manage registration communication with edge systems and populate/update edge registry 450. Using the location of client 602 and the stored locations in edge registry 450, edge discovery component 436 at cloud 604 can return a list of edge systems nearby client 604 (along with network address information, supported data services/preloaded workload resources, computing abilities, and location information).

Edge discovery component 436 at client 602 can maintain a listing of edge systems nearby client 602 (returned by cloud 604) along with location information, network addresses, hardware capabilities, and/or supported data services. The listing of edge systems can be used by edge controller 434 at client 602 to match an edge system with a requested data service (e.g., based on the criteria for the requested data service). In some implementations, edge discovery component 436 at cloud 604 pushes updates about edge systems to edge discovery component 436 at client 602 without a request from client 602. For example, cloud 604 may receive an updated location for client 602 based on a separate communication (e.g., a communication using a separate application). Using the updated location, edge discovery component 436 at cloud 604 can push the edge systems nearby client 602's new location without an explicit request.

Edge controller 434 and resource preloading manager 444 at cloud 604 can track data services for edge systems in a geographic location, select data services for deployment based on the tracking, and preload workload resources 452 corresponding to the selected data services at edge systems. For example, edge cluster manager 606/edge device 608 can store usage of data services performed by the edge system and update edge controller 434 at cloud 604 with the usage data. In another example, edge controller 434 at client 602 can store usage of data services requested by applications running on client 602, and update edge controller 434 at cloud 604 with the usage data.

Edge controller 434 at cloud 604 can track usage of the data services across the geographic location and rank the data services. For example, edge controller 434 at cloud 604 can predict a demand pattern for data services in the geographic location based on historic usage data (e.g., for the users of clients in a given area) and rank the data services according to the predicted demand pattern. In some implementations, the demand pattern is specific to times of day and/or days of week, and the data services ranking changes according to the time of day or day of week. At a given time, edge controller 434 at cloud 604 can select set of highest ranked data services for the geographic location. Resource preloading manger 444 can preload edge systems in the geographic region with workload resources 452 corresponding to the selected data services and/or rebalance workload resources 452 at edge systems in the geographic region.

Client 602 can perform on-device workloads on visual frames using effects engine 442 and workload resources 452. In addition, cloud 604 can also perform workloads on offloaded visual frames using effects engine 442 and workload resources 452. When a data service is selected or requested by an application running at client 602, service location selector 446 determines a processing location for a selected/requested data service. The processing location can be on-device, edge location, or cloud location. Criteria for the received/selected data service can be compared to metrics for client 602 and/or edge systems discovered by client 602. When client 602 cannot perform the received/selected data service on-device (determined based on the comparison), a latency criteria for the data service can be compared to a predicted latency for cloud 604 and predicted latencies for discovered edge systems. When the predicted latency for cloud 604 meets the latency criteria, the data service can be dynamically mapped to the cloud location. When the predicted latency for cloud 604 does not meet the latency criteria, predicted latencies for edge systems discovered by client 602 can be compared to the latency criteria. When at least one of the predicted latencies for edge systems meets the criteria, the data service can be dynamically mapped to an edge location, and a matching edge system can be selected for performing the corresponding workload on the offloaded visual frames.

Those skilled in the art will appreciate that the components illustrated in FIGS. 1-5 and 6A-6B described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 7:
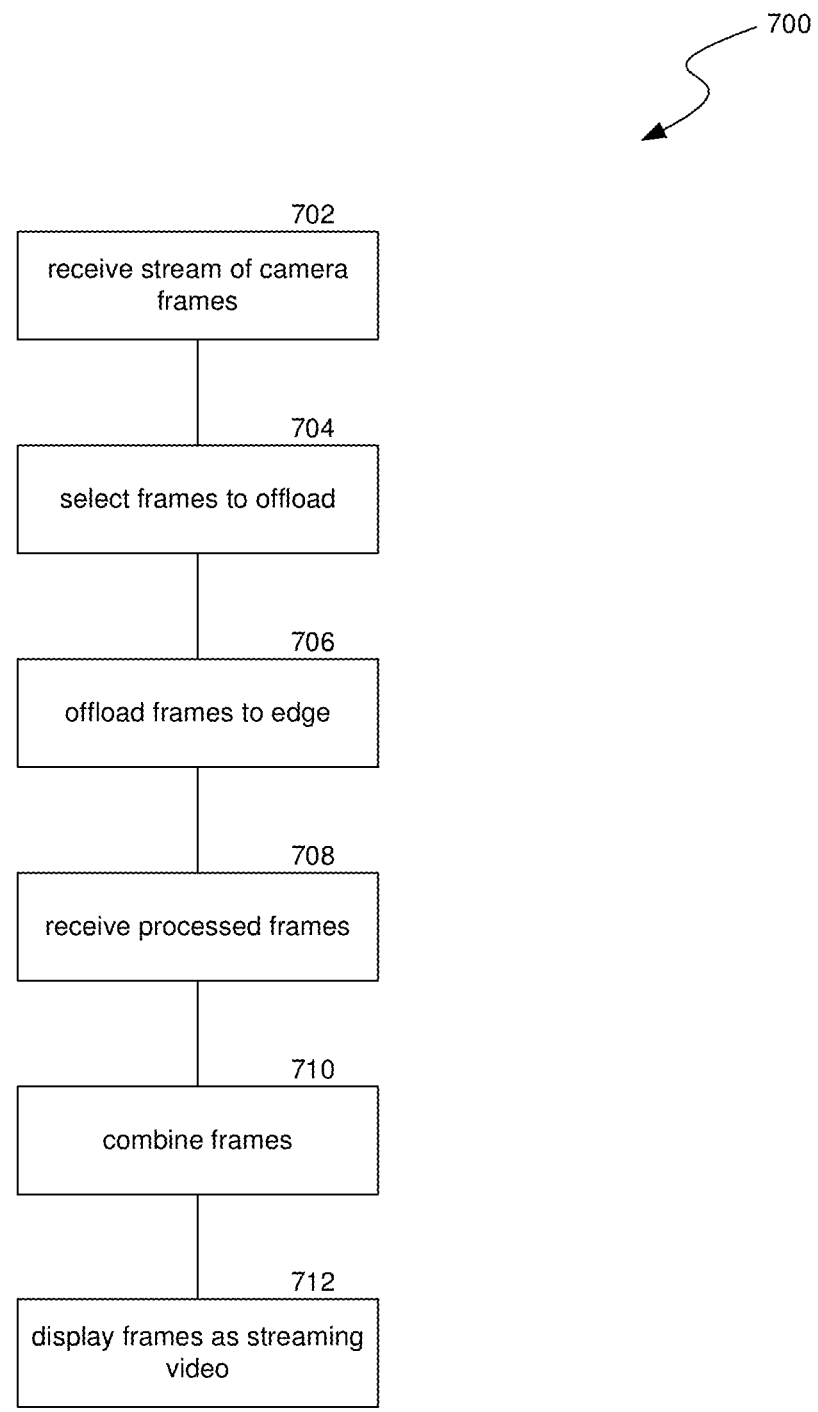
FIG. 7 is a flow diagram illustrating a process used in some implementations of the present technology for selectively offloading visual frames to an edge system for processing.

FIG. 7 is a flow diagram illustrating a process used in some implementations of the present technology for selectively offloading visual frames to an edge system for processing. In some implementations, process 700 can be performed based on the selection of a data service that corresponds to a workload for streaming visual frames. In some implementations, process 700 can be performed in real-time such that streaming visual frames can be received, offloaded, processed, returned, and displayed.

At block 702, process 700 can receive a stream of camera frames at a client computing device. For example, the client computing device can be a smartphone, smart speaker with a display, wearable device with a display, XR device, or any other suitable client computing device. The stream of camera frames can be captured by one or more cameras at or in communication with the client device. In some implementations, an application (e.g., streaming video application, XR application, and the like) running at the client device can receive the stream of camera frames.

At block 704, process 700 can select at least a portion of camera frames from the stream of camera frames for offloading. For example, a data service selection can be received at the application running at the client device at a certain point of time. The selected data service can correspond to a workload for performing on the stream of camera frames.

Based on the selected data services, implementations can determine whether to offload camera frames or perform the selected data service on-device. For example, a mapping (e.g., static or dynamic mapping) can be used to determine a processing location based on the selected service. Determination of a processing location for a selected data service is discussed with reference to process 900 of FIG. 9.

In some implementations, the selection of camera frames can be the camera frames received after the selection of the data service. In another example, adjacent camera frames can be compared to select a portion of the camera frames. Selection of adjacent camera frames is discussed with reference to process 800 of FIG. 8. In some implementations, the portion includes at least half the received camera frames.

At block 706, process 700 can offload the selected portion of the camera frames to an edge computing device. For example, the client device can discover one or more nearby edge devices with a loaded resources that matches the workload for the selected data service. The workload can relate to tracking objects or segments in the visual frames, augmenting the visual frames, video processing, or other suitable workload.

In some implementations, the client device can pre-process the portion of camera frames prior to offloading them to the edge computing device. For example, a model (e.g., machine learning model) can be used to pre-process the portion of camera frames (e.g., to generate bounding boxes for object/segment tracking, a vector representation, an embedding, etc.) and the pre-processed camera frames can be offloaded to the computing device. In some implementations, the output from the pre-processing is a compressed representation of the camera frame, and this compressed representation is offloaded to the edge computing device.

The client device can establish a real-time connection (e.g., WebRTC session) with the edge device and offload the portion of camera frames over the established connection. In some implementations, the edge computing device processes the portion of camera frames using an effects engine and a trained machine learning model.

At block 708, process 700 can receive the processed camera frames at the client computing device. The edge device can return the processed camera frames to the client device over the established real-time connection. At block 710, the received processed camera frames can be combined. In some implementations, the combining can include combining original camera frames (e.g., without a visual augment) with offloaded camera frames (e.g., with a visual augment). The combining can include using timestamps for the camera frames to temporally stitch the camera frames together in chronological order according to the timestamps. In some implementations, a compressed representation of a camera frame is offloaded to the edge computing device, and the processed camera frame returned to the client computing device is a processed compressed representation. Combining the processed camera frames can include rendering a camera frame from the processed compressed representation received from the edge computing device.

At block 712, process 700 can display the processed camera frames (e.g., as a streaming video at the client computing device). For example, the application (e.g., where the data service was selected) can display the processed camera frames. Original camera frames can be combined with offloaded camera frames, and streaming the camera frames can include streaming the original camera frames (e.g., without a visual augment) followed by streaming the offloaded camera frames (e.g., with a visual augment). In some implementations, the capturing of the camera frames (e.g., using the one or more camera) and the displaying of the processed camera frames occurs in real-time.

Figure 8:
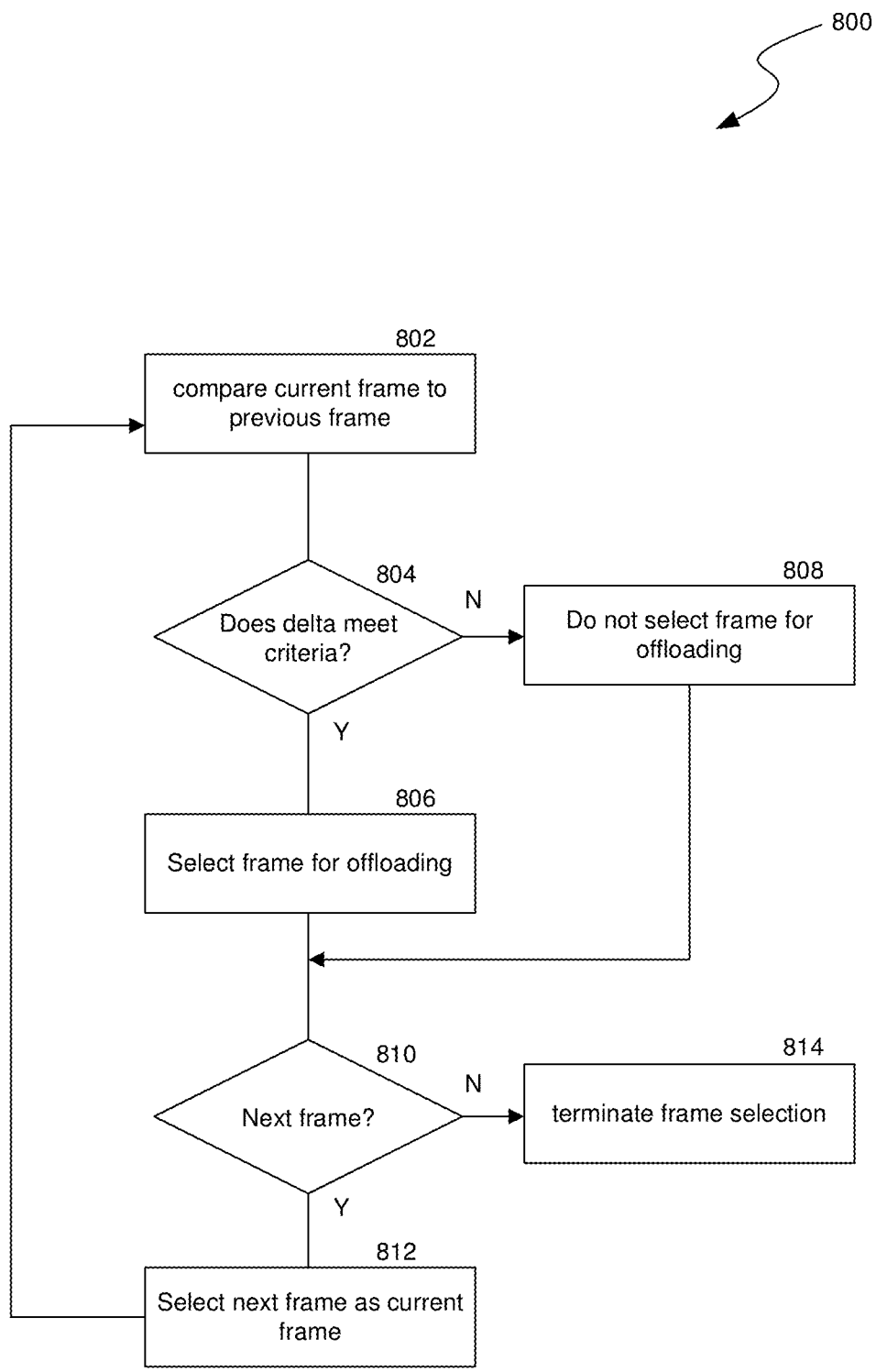
FIG. 8 is a flow diagram illustrating a process used in some implementations of the present technology for selecting visual frames for edge offloading and processing.

FIG. 8 is a flow diagram illustrating a process used in some implementations of the present technology for selecting visual frames for edge offloading and processing. In some implementations, process 800 can be performed based on the selection of a data service that corresponds to a workload for streaming visual frames, e.g., as a sub-process of process 700. In some implementations, process 800 can be performed in real-time to select a portion of visual frames to offload from a client device for processing at an edge device or cloud device.

At block 802, process 800 can compare a first camera frame from a received stream of camera frames to a second camera frame from the stream of camera frames to determine a delta. For example, the comparison can be performed by comparing using pixel values for the frames, comparing between histograms of frames, comparing average color or brightness change, etc. The delta can be representative of a difference between the first frame and the second frame.

At block 804, process 800 can determine whether the delta meets a criteria. For example, the criteria can represent a threshold difference value (e.g., pixel value difference), such as 5%, 10% or 15% difference. When the generated delta is small in value, it can indicate that the second frame provides little to no new information relative to the first frame. When the generated delta is large in value, it can indicate that the second frame provides information different from the first frame (e.g., new information). When the delta meets the criteria, process 800 progresses to block 806, and when the delta does not meet the criteria, process 800 progresses to block 808.

At block 806, process 800 can select the second camera frame as one of the portion of camera frames for offloading. When the delta meets the criteria, the second frame may present new information (relative to the first frame). Accordingly, the second frame can be selected for offloading and for workload processing at an edge system.

At block 808, process 800 can exclude the second camera frame as one of the portion of camera frames for offloading. When the delta does not meet the criteria, the second frame may present little to no new information (relative to the first frame). Accordingly, the second frame can be omitted from the visual frames offloaded for workload processing at an edge system.

Blocks 806 and 808 of process 800 progress to block 810. At block 810, process 800 can determine whether a next frame in the stream of camera frames is received. When the next frame is received, process 800 progresses to block 812, and when the next frame is not received, process 800 progresses to block 814.

At block 812, process 800 can select the second frame as the first frame and the next frame as the second frame. For example, process 800 can move forward in time and evaluate a new set of adjacent frames to determine whether the second frame of the adjacent frames should be selected for offloading.

Block 812 of process 800 loops back to block 802, where the newly selected first frame and second frame are compared to generate a delta. Process 800 can loop until it is determined that no next frame is received at block 810, and which point process 800 can progress to block 814. At block 814, process 800 can terminate the frame selection. For example, no next frame may be received when an application stops streaming visual frames, when a data service is no longer selected, or based on any other stop or termination criteria.

Figure 9:
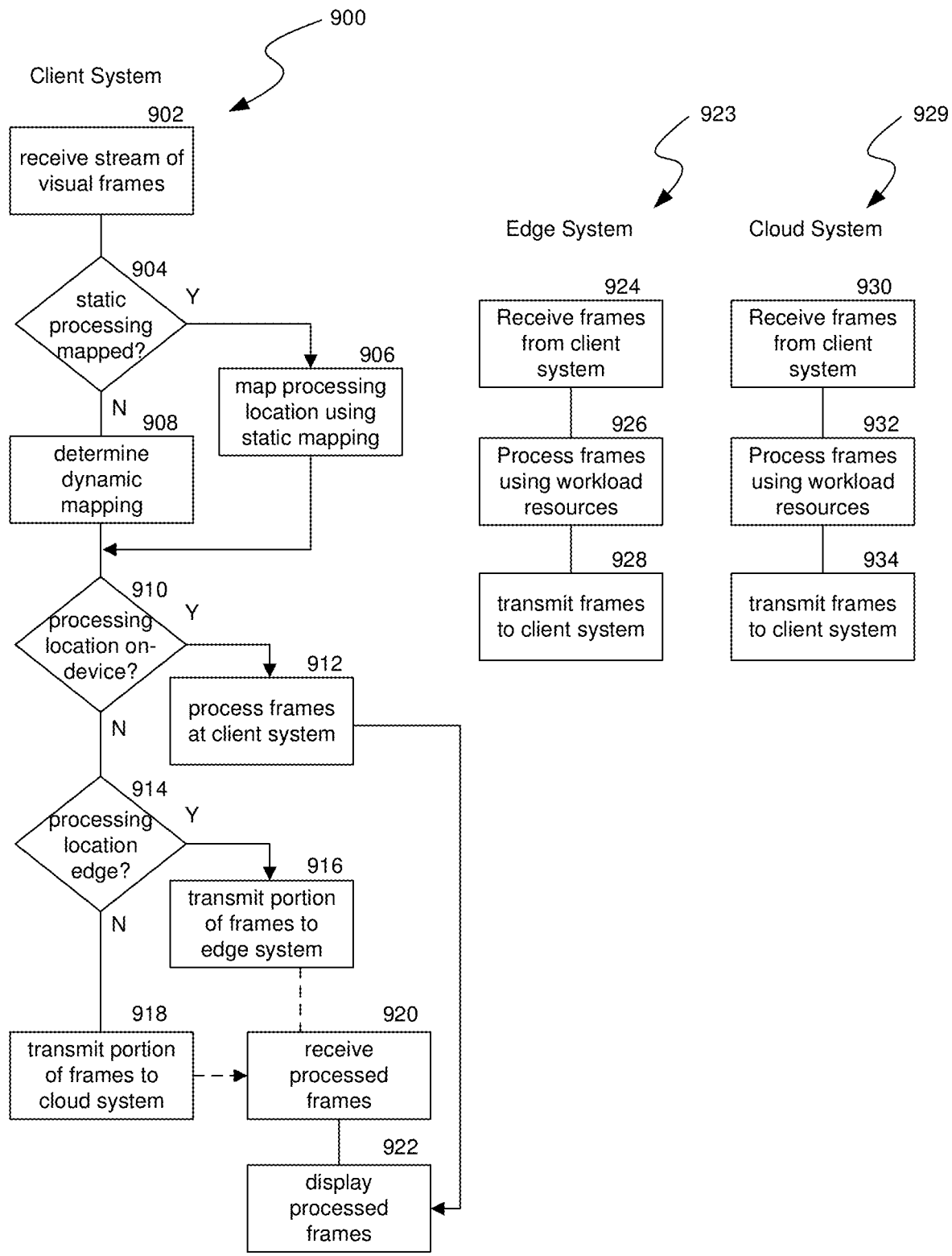
FIG. 9 is a flow diagram illustrating a process used in some implementations of the present technology for offloading visual frames to a selected edge location for processing.

FIG. 9 is a flow diagram illustrating processes used in some implementations of the present technology for offloading visual frames to a selected edge location for processing. In some implementations, processes 900, 923, and 929 can be performed based on the selection of a data service that corresponds to a workload for streaming visual frames. In some implementations, processes 900, 923, and 929 can be performed in real-time such that streaming visual frames can be received, offloaded, processed, returned, and displayed. Processes 900, 923, and 929 includes flows for a client system, edge system, and cloud system. The process 900 for the client system includes blocks 902-922, the process 923 for the edge system includes blocks 924-928, and the process 929 for the cloud system includes blocks 930-934.

At block 902, process 900 can receive streaming data comprising visual frames at a client system. For example, the client system can be a smartphone, smart speaker with a display, wearable device with a display, XR device, or any other suitable client computing device. The stream of camera frames can be captured by one or more cameras at or in communication with the client system. In some implementations, an application (e.g., streaming video application, XR application, and the like) running at the client system can receive the stream of camera frames.

At least one service can be selected for the visual frames, the service corresponding to a workload for the visual frames. For example, the service can be selected by a user via the application (e.g., selection of an augment for stream camera frames), selected by the application itself (e.g., in order to meet a client request, display an object/three-dimensional volume, or meet any other application criteria), or selected by an external application or party. Example data services include object or person tracking in the visual frames, generating overlays, masks, images, or three-dimensional volumes for augmenting the visual frames, artificial reality video processing for the processed visual frames, three-dimensional mapped environment video processing for the processed visual frames, generative adversarial network ("GAN") processing, audio processing, and any other suitable data service for processing offloaded visual frames.

At block 904, process 900 can determine whether the selected service has a static processing location mapped. Example process locations include on-device, edge location, and cloud location. Some example data services can have a static mapping to an on-device location while other example data services can have a static mapping to a cloud location or an edge location. For example, face tracking can be mapped to be an always on-device service due to its use of sensitive data. One or more example data services can have a dynamic mapping according to comparison between a criteria for the selected service and one or more metrics for the client system, edge system, and/or cloud system. For example, an audio transformation can be mapped to be performed on a client device when the client device has sufficient compute resources available, but can be offloaded when such resources are not available.

When the processing location is determined to have a static mapping, process 900 progresses to block 906, and when the processing location is determined not to have a static mapping, process 900 progresses to block 908. At block 906, process 900 can map the process location for the data service according to the static mapping, such as on-device, edge location, or cloud location. For example, it can be determined that at least a portion of visual frames will be offloaded when the static mapping is the edge location or the cloud location.

At block 908, process 900 can determine a dynamic mapping that defines the processing location for the selected service. In some implementations, the dynamic mapping for the selected service can be determined using one or more of client system utilization, discovered edge systems and their loaded resources, criteria for the data service, or any combination thereof. For example, the dynamic mapping can be determined according to one or more of: a client system computing power metric, a client system capacity metric, client system preloaded resources, a service criteria for the selected service, an availability of an edge system with a matching capability (e.g., preloaded workload resource) that meets a criteria for the selected service, a utilization metric for an edge system with a matching capability, latency parameters for edge and/or cloud locations, or any combination thereof.

The selected/requested data service can include one or more criteria for performing the data service. Example criteria can include a resource criteria for performing the data service (e.g., one or more of workload resources), a latency criteria (e.g., 15 milliseconds, 20 milliseconds, 30 milliseconds, 40 milliseconds, and the like), a processing power criteria (e.g., threshold on-device processing power), and other suitable criteria. In some implementations, a comparison between the criteria for one or more data services can be compared to the metrics for a client system to generate a dynamic mapping for the data services.

Example metrics for the client system include a processing power metric for the client system (e.g., combination of speed, number of cores, cache memory, and other suitable parameters that reflect the processing power of a device), a client system capacity metric (e.g., processor utilization, memory utilization, and the like), client system preloaded resources (e.g., workload resources), and other suitable metrics. In some implementations, the criteria for the selected/requested data service can be compared to the metrics for the client system to dynamically map the location of the requested/selected service.

An example comparison can be comparing the client device computing power metric and/or client device preloaded resources to the processing power criteria and resource criteria of the requested/selected data service. When the client system metrics meet the data service criteria the determined processing location can be dynamically mapped to on-device, and when the client system metrics fail meet the data service criteria the determined processing location can be dynamically mapped to an edge location (or a cloud location).

In some implementations, when the client system metrics meet the data service criteria an additional comparison can be performed that compares the processing power criteria to a utilization metric for the client system (e.g., processor utilization, memory utilization, and the like). For example, a processing power criteria that reflects a high resource spend for performing the data services may be incompatible with an on-device mapping when the utilization metric for the client systems indicates that computing resources may not currently be available. In this example, the processing power criteria can be translated to a predicted client system utilization, and when the utilization metric fails to meet the predicted client system utilization, the data services can be dynamically mapped to an edge location or a cloud location.

In some implementations, when a data service is not dynamically mapped to an on-device processing location, the dynamic mapping can be an edge system or a cloud system. It can be determined that at least a portion of visual frames will be offloaded when the dynamic mapping is the edge location or the cloud location. A dynamic mapping other than an on-device mapping can be determined according to latency criteria for the selected/requested data service, edge system resources, and/or edge system utilization. The edge systems discovered by a client system can each have a predicted latency based on their relative locations to the client system. A cloud system can similarly include a predicted latency metric (e.g., based on tracked communications to and from the cloud system, such as the communication related to edge system discovery, a test communication, or historic averages).

When it is determined that a data service is to be offloaded, preloaded resources at discovered edge systems (e.g., workload resources) can be compared to the resource criteria for a requested/selected data service. The discovered edge services with one or more preloaded resources that match the data service resource criteria can be shortlisted. The predicted latency metrics for these shortlisted edge systems can then be compared to the latency criteria for the data services. When at least one edge system has a predicted latency metric that meets the latency criteria, the data service can be dynamically mapped to an edge location. In some implementations, the edge system with the predicted latency metric that meets the criteria can be selected for the data service.

In some implementations, the latency criteria for a selected/requested data service can be compared to the predicted latency metric for the cloud system. When the predicted latency for the cloud system meets the latency criteria, the data service can be dynamically mapped to the cloud location. In this example, a mapping to the cloud location can be prioritized over a mapping to an edge location. When the latency criteria for a data service permits processing in the cloud, this mapping can take precedence over a mapping to an edge location because computing resources may be limited at edge systems.

In some implementations, a first data service and a second data service can be selected for the visual frames, the first service corresponding to a first workload for the visual frames and the second service corresponding to a second workload for the visual frames. In this example, determining the processing location for the portion of the visual frames can include determining an overall processing location for both the first data service and the second data service. The overall processing location can be based on a first mapping for the first service and a second mapping for the second service. For example, the first mapping can define a first processing location for performance of the first workload and the second mapping can define a second processing location for performance of the second workload.

The overall processing location can be determined to be an edge location when at least one of the first processing location and/or the second processing location is the edge location. In this example, the edge system that receives the offloaded visual frames can perform both the first workload and the second workload. Because at least one of the data services is mapped to the edge location in this example, an edge system will receive offloaded visual frames. The edge system can then perform both the first data service and the second data service on the offloaded visual frames even when only one of the first data service and second data service is mapped to the edge location. Performing both the first data service and second data service at the edge system can save computing resources at the client system.

At block 910, process 900 can determine whether the processing location is on-device. For example, the data service can be mapped (according to a dynamic or static mapping) to a processing location. When the processing location is determined to be on-device, process 900 progresses to block 912, and when the processing location is determined not to be on-device, process 900 progresses to block 914.

At block 912, process 900 can process the visual frames on-device at the client system to perform the data service. For example, one or more software components (e.g., an effects engine) and resources (e.g., workload resources) can be used to perform a workload on the visual frames and render the data service. The output from the data service can be processed visual frames (e.g., visual frames with a generated augment).

At block 914, process 900 can determine whether the processing location is an edge location. When the processing location is determined to be an edge location, process 900 progresses to block 916, and when the processing location is determined not to be an edge location, process 900 progresses to block 918.

At block 916, process 900 can offload a portion of the visual frames to an edge system. For example, a portion of visual frames received at the client system can be transmitted to the edge system for processing. The portion can be selected based on a timing for receiving the data service selection, the workload for the visual stream that corresponds to the data service, visual stream compression, comparisons among adjacent visual frames, or any other suitable manner. The line connecting block 916 and 920 is dashed to illustrate that process 923 can be performed between these blocks.

At block 918, process 900 can offload a portion of the visual frames to a cloud system. For example, a portion of visual frames received at the client system can be transmitted to the cloud system for processing. The portion can be selected based on a timing for receiving the data service selection, the workload for the visual stream that corresponds to the data service, visual stream compression, comparisons among adjacent visual frames, or any other suitable manner. The line connecting block 918 and 920 is dashed to illustrate that process 929 can be performed between these blocks.

At block 920, process 900 can receive processed visual frames. For example, a portion of visual frames can be offloaded to an edge system or a cloud system, and processed visual frames (e.g., after performance of a workload on the visual frame that generates an augment) can be returned to the client system.

At block 922, process 900 can display the processed visual frames as streaming video using the client system. For example, the application running on the client system can display the visual frames as streaming video, in an AR environment, or in any other suitable streaming display. In some implementations, the receiving of the visual frames and the displaying of the processed visual frames occurs in real-time.

Blocks 924-928 of process 923 represent the flow for an edge system. At block 924, process 900 can receive offloaded frames at an edge system from a client system. For example, the client system can establish a real-time communication session with the edge system and offload streaming visual frames over the real-time communication session.

At block 926, process 923 can process the visual frames at the edge system using a workload resource. For example, the edge system can be prepopulated with workload resources (e.g., a trained machine learning models) and software components for performing a data service (e.g., an effects engine). In some implementations, a given workload resource can be configured to perform one or more workloads that correspond to data services. The edge system can implement the software components and workload resources to perform a workload on the visual frames that corresponds to the requested/selected data service.

At block 928, process 923 can transmit the processed frames from the edge system to the client system. For example, once the workload resource and software component are used to process the visual frames (e.g., render visual frames with an augmentation), processed frames can be transmitted back to the client system over the established real-time communication session.

Blocks 930-934 of process 929 represent the flow for a cloud system. At block 930, process 929 receives offloaded frames at a cloud system from a client system. For example, the client system can establish a real-time communication session with the cloud system and offload streaming visual frames over the real-time communication session.

At block 932, process 929 can process the frames at the cloud system using a workload resource. For example, the cloud system can store resources (e.g., a trained machine learning models) and software components for performing a data service (e.g., an effects engine). In some implementations, a given workload resource can be configured to perform one or more workloads that correspond to data services. The cloud system can implement the software components and workload resources to perform a workload on the visual frames that corresponds to the requested/ selected data service.

At block 934, process 929 can transmit the processed frames from the cloud system to the client system. For example, once the workload resource and software component are used to process the visual frames (e.g., render visual frames with an augmentation), the processed frames can be transmitted back to the client system over the established real-time communication session.

Figure 10:
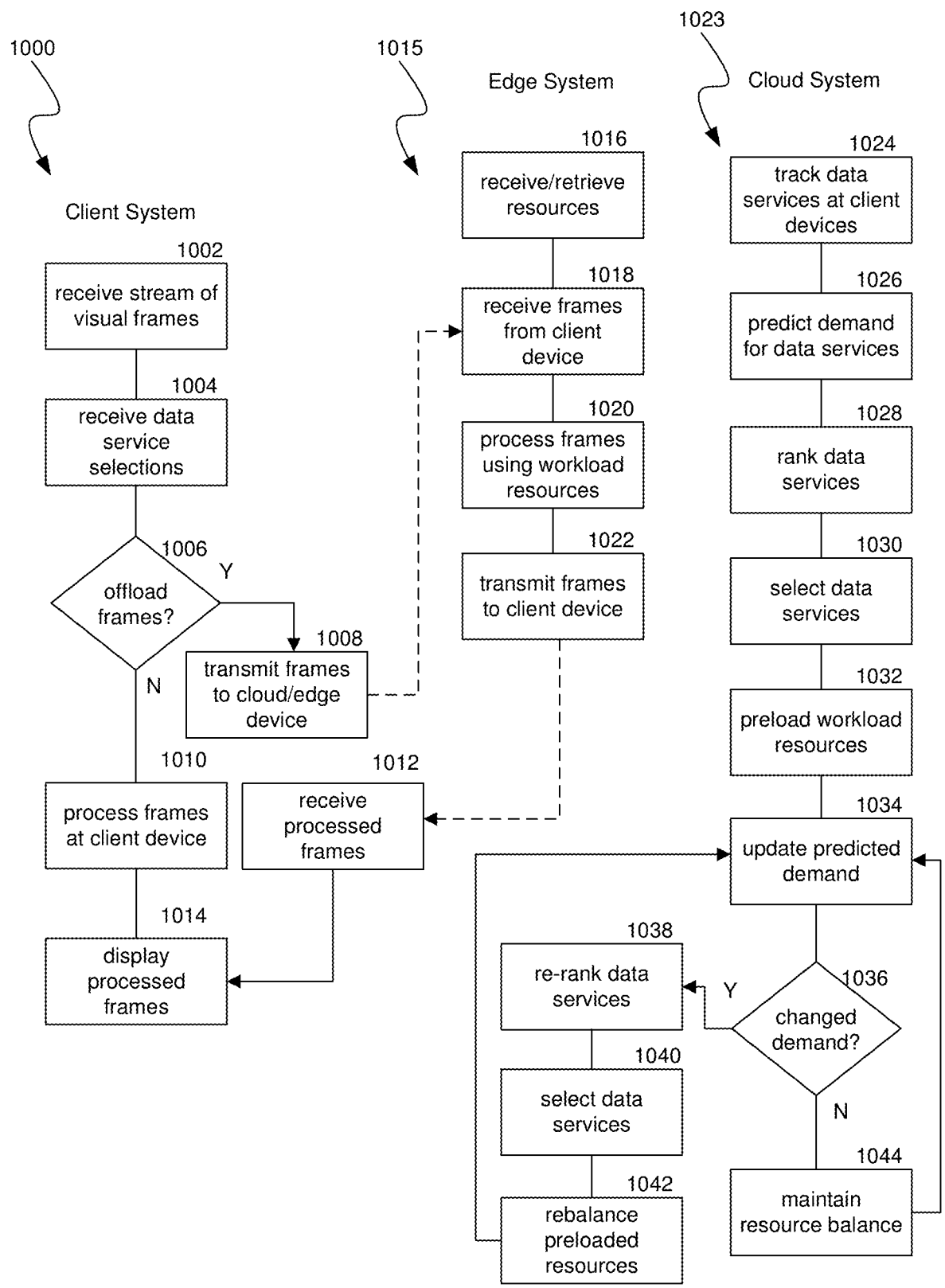
FIG. 10 is a flow diagram illustrating a process used in some implementations of the present technology for distributing workload resources to edge systems to support client offload.

FIG. 10 is a flow diagram illustrating a process used in some implementations of the present technology for distributing workload resources to edge systems to support client offload. In some implementations, process 1015 can be performed to load edge systems with resources for processing streaming visual frames. In some implementations, processes 1000 and 1015 can be performed in real-time such that streaming visual frames can be received, offloaded, processed, returned, and displayed.

Process 1000 includes flows for a client system, edge system, and cloud system. The flow for the client system includes blocks 1002-1014, the flow for the edge systems includes blocks 1016-1022, and the flow for the cloud system includes blocks 1022-1044.

At block 1002, process 1000 can receive streaming data including visual frames at a client computing system. For example, the client system can be a smartphone, smart speaker with a display, wearable device with a display, XR device, or any other suitable client computing device. The stream of camera frames can be captured by one or more cameras at or in communication with the client system. In some implementations, an application (e.g., streaming video application, XR application, and the like) running at the client system can receive the stream of camera frames.

At block 1004, process 1000 can receive data service selections for the stream of visual frames. For example, the data service can be selected by a user via the application (e.g., selection of an augment for streaming camera frames), selected by the application itself (e.g., in order to meet a client request, display an object/three-dimensional volume, or meet any other application criteria), or selected by an external application or party. Example data services include object tracking for objects in the visual frames, generating overlays, masks, images, or three-dimensional volumes for augmenting the visual frames, artificial reality video processing for the processed visual frames, three-dimensional mapped environment video processing for the processed visual frames, generative adversarial network ("GAN") processing, and any other suitable data service for processing offloaded visual frames.

At block 1006, process 1000 can determine whether to offload one or more of the received visual frames. For example, the received data service can have a static mapping to a processing location (e.g., on-device, edge location, or cloud location) or a dynamic mapping can be determined for the data service. Process 900 of FIG. 9 includes descriptions for determining a processing location for visual frames after receiving a selection for a data service.

When it is determined that process 1000 should offload the visual frames, process 1000 progresses to block 1008, and when it is determined that process 1000 should not offload the visual frames, process 1000 progresses to block 1010. At block 1008, process 1000 can offload at least a portion of the visual frames to an edge system or a cloud system. For example, based on the selected edge system and/or cloud system for the offloading, the client system can establish a real-time communication session with the edge system or cloud system. In some implementations, a portion of visual frames received at the client system can be transmitted to the edge system or cloud system for processing (e.g., as indicated by the dashed line connecting block 1008 to 1018). The portion can be selected based on a timing for receiving the data service selection, the workload for the visual stream that corresponds to the data service, visual stream compression, comparisons among adjacent visual frames, or any other suitable manner. In some implementations, instead of offloading whole visual frames, some pre-processing can be performed on the client (such as to create vector representations, histograms of images, detect objects and mask out corresponding portions, etc.) and the pre-processed data can be transmitted for edge processing instead of the full frame.

At block 1010, process 1000 can process the visual frames at the client system. For example, one or more software components (e.g., an effects engine) and resources (e.g., workload resources) can be used to perform a workload on the visual frames and render the data service. The output from the data service can be processed visual frames (e.g., visual frames with a generated augment).

At block 1012, process 1000 can receive the processed visual frames. For example, a portion of visual frames can be offloaded to an edge system or a cloud system, and the processed visual frames (e.g., after performance of a workload on the visual frame that generates an augment) can be returned to the client system.

At block 1014, process 1000 can display the processed visual frames as streaming video using the client system. For example, the application running on the device can display the visual frames as streaming video, in an AR environment, or in any other suitable streaming display. In some implementations, the receiving of the visual frames and the displaying of the processed visual frames occurs in real-time.

Blocks 1016-1022 of process 1015 represent the flow for an edge system. At block 1016, process 1015 can receive or retrieve workload resources and software components for performing data services on streaming visual frames. For example, the edge system can be preloaded with workload resources and software components (e.g., effects engine) for performing computing workloads that correspond to data services. Example data services can include object tracking for objects in the visual frames, generating overlays, masks, images, or three-dimensional volumes for augmenting the visual frames, artificial reality video processing for the processed visual frames, three-dimensional mapped environment video processing for the processed visual frames, generative adversarial network ("GAN") processing, and any other suitable data service for processing offloaded visual frames. The edge system can be preloaded with one or more workload resources (e.g., trained machine learning models) that correspond to one or more of these data services.

Preloading the edge system can be achieved by receiving the software components and/or workloads resources at the edge system from an external source (e.g., cloud system, CDN, and the like). In another example, the edge system can be provided instructions and/or network locations to retrieve the software components and/or workload resources.

At block 1018, process 1015 can receive offloaded frames at an edge system from a client system. For example, the client system can establish a real-time communication session with the edge system and offload streaming visual frames over the real-time communication session.

At block 1020, process 1015 can process the visual frames at the edge system using a workload resource. For example, the edge system can be prepopulated with workload resources (e.g., a trained machine learning models) and software components for performing a data service (e.g., an effects engine). In some implementations, a given workload resource can be configured to perform one or more workloads that correspond to data services. The edge system can implement the software components and workload resources to perform a workload on the visual frames that correspond to the requested/selected data service.

At block 1022, process 1015 can transmit the processed frames from the edge system to the client system. For example, once the workload resource and software component are used to process the visual frames (e.g., render visual frames with an augmentation), the processed frames can be transmitted back to the client system over the established real-time communication session (e.g., as indicated by the dashed line connecting block 1022 to 1012).

Blocks 1024-1044 of process 1023 represent the flow for a cloud system. At block 1024, process 1023 can track data services rendered at client systems. Implementations of the cloud system can track the data services running in a geographic location. For example, the geographic location can be a predetermined geographic region, a grouping of edge systems that correspond to a mapped coverage region, a dynamic geographic region, a portion of a city, county, or other known geographic location, or any other suitable geographic location.

The cloud system can track the usage of data services performed by the edge systems within the geographic location (e.g., performed on offloaded visual frames). For example, edge systems/devices within the geographic location may store usage information (e.g., logs with timing information, frequency information, and other suitable usage information) of the data services performed at each edge system/device, and the usage information can be accessed to track the data services performed in a geographic location. In another example, client systems/devices may store usage information about requested/selected data services, and the usage information can be accessed to track the data services performed in a geographic location. In some implementations, the tracked data services can relate to one or more applications (e.g., applications running on the client systems). In some implementations, the data services are rendered via performance of a workload on a visual data stream.

At block 1026, process 1023 can predict a demand for the tracked data services. For example, usage data (e.g., logs) for the performed data services can be stored by client systems and/or edge systems. The usage data can include identifiers for data services performed, timing (e.g., time of day and day of week), duration of usage, and other suitable information. Edge systems and/or client systems can report the usage data to the cloud systems, for example periodically over a given timeframe. The usage data can be analyzed by an analytical model (e.g., machine learning model, or other suitable model) to predict a demand pattern for the data services. For example, the demand pattern can define a predicted a demand for a given data service at different times of the day and days of the week.

In some implementations, the predicated demand can be generated based on the usage patterns for client systems within the geographic location. For example, client systems located within the geographic location at a given time can report data service usage to the cloud systems. The client system usage data can be analyzed by the analytical model to predict a demand pattern for the data services based on the client systems located in the geographic location.

At block 1028, process 1023 can rank the tracked data services according to the predicted demand. For example, based on the predicted demand pattern and a given time of day, the data services can be ranked according to the predicted demand at the given time of day. The data services can be ranked in ascending or descending order.

Other example rankings include ranking data services by a usage metric, a user value metric, a priority metric, a predicted demand, a quality metric, any other suitable metric, or any combination thereof. In an example, the user value metric can combine a data service's usage metric with a resource consumption metric for the data service. For example, some data services may consume client device resources at a higher rate than other data services. The resource consumption metric can reflect a data service's power consumption, processor utilization, storage requirements, and other suitable client device resource consumption parameters. The usage for a data service and the data service's resource metric can then be combined (e.g., summed, averaged, weighted average, etc.) to generate the user value metric. A ranking according to the user value metric can balance the usage of a data service with the burden that the data service puts on a client device.

In another example, the priority metric can represent a priority for data services, such as a priority different from popularity and/or client device resource consumption. In some implementations, a dynamic may exist between a given data service and a new or present circumstance, such as the release of a new application for one or more client devices, the release of a new client device or client device type, or any other suitable circumstance. The new or present circumstance may put an incentive on the given data services that is not reflected in its past usage or its client device resource consumption. Accordingly, the tracked data services can be assigned a priority metric (e.g., binary, such as high or low priority, numeric, such as first, second, third, fourth, etc., and the like) and ranked according to the priority metric or a combination of the priority metric and other suitable metrics.

The cloud system can also track a quality metric for data services rendered at client systems in the geographic location. In an example where a given data service relates to performing a workload on visual frames, a resolution and/or frame rate of the displayed visual frames (after performance of the workload) can be tracked by the displaying client system. In another example, feedback can be received about the quality of the displayed visual frames (after performance of the workload). The quality metric for a tracked data service can be the tracked resolution (e.g., average or median resolution), frame rate (e.g., average or median frame rate), feedback (e.g., average of user reported quality), or any combination thereof.

At block 1030, process 1023 can select a set of data services according to the ranking. Using the ranking and any other suitable criteria, data services can be selected for deployment in the geographic location. The data services selected for deployment can include a set of the highest ranked data services (e.g., 3, 4, 5, or more), or any other suitable set of data services.

At block 1032, process 1023 can preload one or more edge systems, within the geographic location, with workload resources that correspond to the selected data services. For example, the selected data services can correspond to one or more workload resources that perform workloads on streaming visual frames, such as trained machine learning models, 3D or 2D models, images, audio, kinematic models, etc. Edge systems across the geographic location can be preloaded with the corresponding workload resources. For example, the workload resources can be transmitted to the edge systems or the edge systems can be provided instructions/network locations for retrieving the workload resources.

In some implementations, a first number of edge systems within the geographic location for a first data service can be determined according to a predicted demand for the first data service, and the first number of edge systems within the geographic location can be preloaded with a workload resource that corresponds to the first data service. In another example, a first amount of a first workload resource for the geographic location can be determined according to a predicted demand for a data service corresponding to the first workload resource, and the edge systems within the geographic location can be preloaded with the first amount of the first workload resource.

In some implementations, the workload resources configure the edge systems to perform the selected data services. For example, the edge systems can be configured to a) establish a real-time communication session with one or more client devices, b) receive offloaded visual frames from the client devices, c) process the offloaded visual frames using the preloaded workload resources to perform the selected data services, and d) return the processed visual frames to the client devices for display.

At block 1034, process 1023 can predict an updated demand for the tracked data services within the geographic location at a second point in time. For example, the predicted demand for the data services can be a demand pattern that varies during different times of day and/or days of the week. Given a new time of day/day of week, the predicted demand can be updated using the predicted demand pattern. Any other suitable technique for updating the predicted demand of data services can be implemented.

At block 1036, process 1023 can determine whether a change in the predicted demand meets a criteria. For example, an existing deployment of workload resources may be suitable for a small change between the new predicted demand and the previous predicted demand for data services. A large change may indicate that an existing workload resources deployment may no longer be suitable to address the changing circumstances.

In some implementations, the change between a new predicted demand and a previous predicted demand can be calculated by reranking the data services based on the new predicted demand and comparing the previous ranking to the reranking. When one or more of the set of highest ranked data services (e.g., 3, 4, 5, or more highest ranked data services) changes between the rankings, it may be determined that the calculated change meets the criteria. In another example, new predicted demand values for the data services can be compared to previous predicted demand values. The change criteria can include a threshold value and a threshold number of data services. It can be determined that a given data service experienced a demand change when the calculated delta between the new predicted demand values and previous predicted demand values meets the threshold value. In addition, it can be determined that the change in demand meets the criteria when the number of data services that experienced a demand change meets the threshold number of data services.

When a change in predicated demand meets the criteria, process 1023 can progress to block 1038, when a change in predicted demand does not meet the criteria, process 1023 can progress to block 1044. At block 1038, process 1023 can re-rank the tracked data services according to the updated predicted demand. For example, based on the updated predicted demand pattern and a new given time of day/day of week, the data services can be re-ranked according to the predicted demand at the new time of day/day of week. The data services can be reranked in ascending or descending order. Other example rankings include ranking data services by a usage metric, a user value metric, a priority metric, a predicted demand, a quality metric, any other suitable metric, or any combination thereof. Re-ranking the data services can include ranking by any suitable one or combination of these metrics or demands.

At block 1040, process 1023 can select a set of data services according to the re-ranking. Using the re-ranking and any other suitable criteria, data services can be selected for deployment in the geographic location. The data services selected for deployment can include a set of the highest re-ranked data services (e.g., 3, 4, 5, or more), or any other suitable set of data services. In some implementations, the set of data services selected according to the re-ranking can exclude one or more previously selected data services and/or include one or more newly selected data services.

At block 1042, process 1023 can rebalance preloaded workload resources that correspond to the selected data services at edge systems in the geographic location. For example, when a new data service is selected (which was previously not selected based on the previous ranking) a workload resources that corresponds to the new data service can be preloaded to edge systems within the geographic location. In another example, when a data service previously selected (based on the previous ranking) is no longer selected, the edge systems prepopulated with a workload resource corresponding to the no longer selected data service can be instructed to deactivate or discard the corresponding workload resource. Discarding a workload resource can include deleting the workload resource from memory while deactivating the workload resources can include removing the workload resources from an active portion of the edge system but maintaining the workload resource in persistent memory.

In some implementations, rebalancing workload resources includes prepopulating new workload resources to edge systems. In another example, rebalancing workload resources includes instructing edge systems to activate a deactivated workload resource. For example, an edge registry maintained at the cloud system can store active and inactive workload resources stored at an edge system.

In some implementations, the first number of edge systems within the geographic location for a first data service determined according to the previous predicted demand for the first data service can be adjusted based on the new predicted demand for the first data service. The number of edge systems within the geographic location preloaded with a workload resource that corresponds to the first data service can be rebalanced from the first number to the adjusted number.

In another example, the first amount of a first workload resource for the geographic location determined according to a previous predicted demand for a data service corresponding to the first workload resource can be adjusted based on the new predicted demand for the first data service. The amount of the first workload resources preloaded to edge systems within the geographic location can be rebalanced from the first amount to the adjusted amount.

Process 1023 can loop from block 1042 to block 1034 to update the predicted demand for data services as time progresses. At block 1044, process 1023 can maintain a current balance of workload resources at the edge systems in the geographic location. For example, when the calculated change in demand does not meet a criteria, it can indicate that an existing workload resource deployment is suitable.

Process 1023 can loop from block 1044 to block 1034 to update the predicted demand for data services as time progresses. For example, over time the demand for predicted data services can be updated and workload resources can be rebalanced and/or new workload resources can be distributed.

In some implementations, at least one edge system is a cluster edge service with two or more edge devices managed by an edge cluster device manager. For example, the edge cluster device manager can be configured to receive client device requests for data services and route offloaded visual frames to at least one of the edge devices in the cluster edge service.

When the edge cluster device manager is connected to a client device that requests a first data service, the edge cluster device manager can select one or more of the edge devices in the cluster edge service for the first data service. In this example, the edge cluster device manager can select the one or more edge devices by matching a preloaded workload resource at the selected edge device(s) to the first data service request. The edge cluster device manager can then route offloaded visual frames received from the client device to the selected one or more edge service devices for processing using the matching preloaded workload resource.

In some implementations, the edge cluster device manager can distribute preloaded resources to the edge devices in the edge service cluster. For example, a first workload resource can correspond to a first data service, a second workload resource can correspond to a second data service, and preloading the cluster edge service can include preloading the first workload resource to a first edge device at the cluster edge service and preloading the second workload resource to a second edge device at the cluster edge service.

Figure 11:
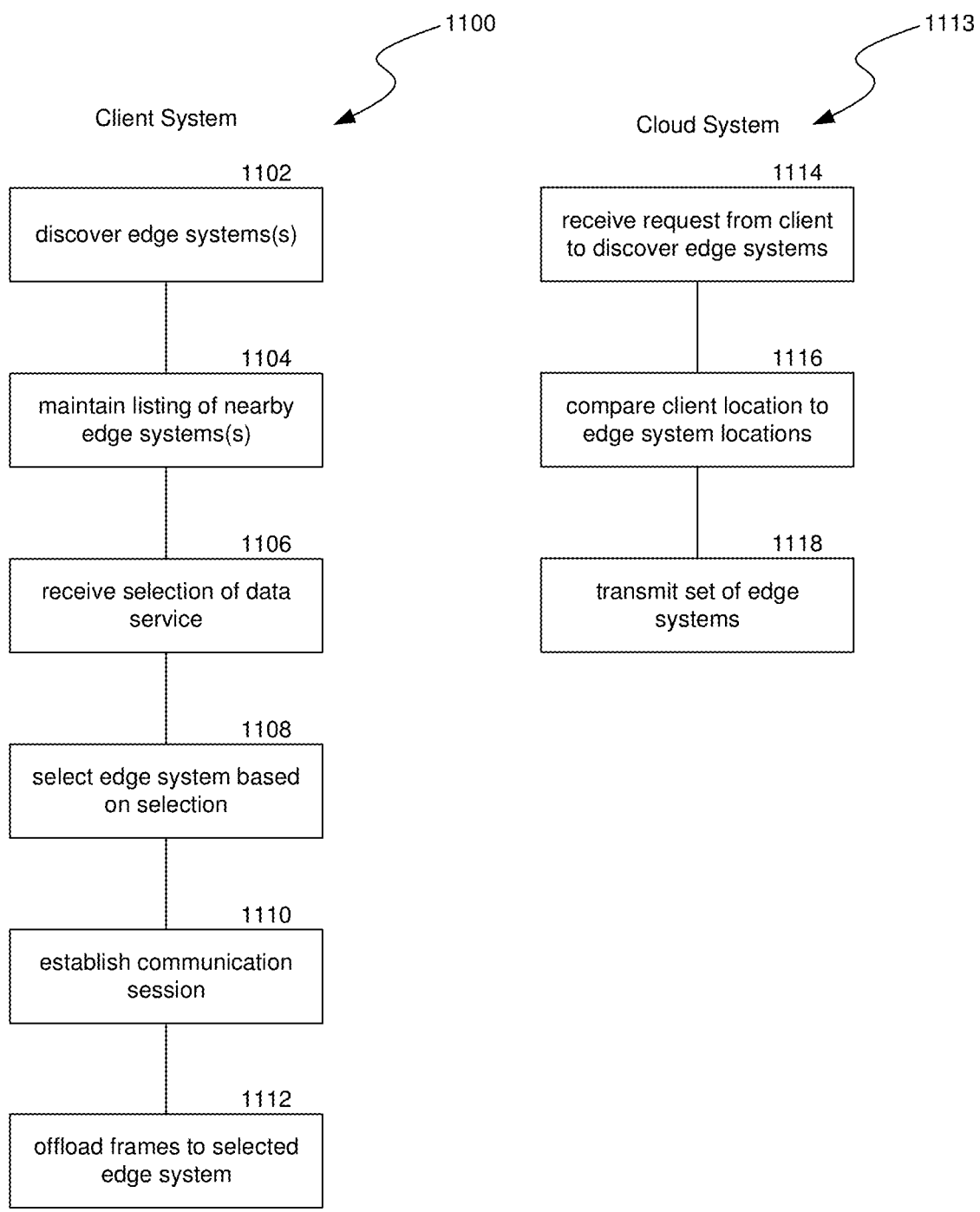
FIG. 11 is a flow diagram illustrating a process used in some implementations of the present technology for discovering edge systems for visual frame offload.

FIG. 11 is a flow diagram illustrating a process used in some implementations of the present technology for discovering edge systems for visual frame offload. In some implementations, processes 1100 and 1113 can be performed based on the selection of a data service that corresponds to a workload for streaming visual frames. In some implementations, processes 1100 and 1113 can be performed in real-time such that streaming visual frames can be received, offloaded, processed, returned, and displayed.

Processes 1100 and 1113 includes flows for a client system and cloud system. The process 1100 for the client system includes blocks 1102-1112, the process 1113 for the cloud system includes blocks 1114-1118. At block 1102, process 1100 can discover nearby edge systems. For example, the client system can transmit a request, to a cloud system, to discover edge systems nearby the client system. The cloud system can return a listing of edge systems nearby the client system's locations (e.g., within a threshold distance, edge systems within a geographic location occupied by the client system). The returned edge system information can also include network address information, supported data services/preloaded workload resources, hardware configuration or service capabilities, location information, and other suitable edge system information.

In some implementations, the request to discover edge systems nearby the client system can also includes a requested data service. In this example, the cloud system can return a listing of edge systems loaded with a resource (e.g., workload resources) that corresponds to the requested data service.

At block 1104, process 1100 can maintain a listing of nearby edge systems. For example, the client system can periodically request edge system updates to discover new edge systems, discover edge systems nearby a new location, and/or update the information about edge systems nearby the client system. In some implementation the cloud system can push updates to the client system, for example based on the cloud system receiving an updated location for the client system.

At block 1106, process 1100 can receive a selection of a data service at the client system. For example, an application (e.g., streaming video application, XR application, and the like) running on the client system can receive a user selection for a data service (e.g., augment to the streaming video).

At block 1108, process 1100 can select an edge system that matches the selected data services. For example, the maintained list of nearby edge systems can include loaded resources/capable data services for the edge systems. The client system can select a nearby edge system with loaded resources/capable data services that match the requested data service. If multiple nearby edge systems match the requested service, the client system can select the edge system closest in proximity to the client system.

At block 1110, process 1100 can establish a real-time communication session between the client system and the selected edge system. For example, using the address information stored for the selected edge system, the client system can establish a real-time communication session (e.g., WebRTC session) with the edge system.

At block 1112, process 1100 can offload visual frames to the selected edge system over the established real-time communication session. The edge system can process the offloaded visual frames using the resources loaded at the edge system (e.g., workload resource and effect engine) and return the processed visual frames to the client system.

Blocks 1114-1118 of process 1113 represent the flow for a cloud system. At block 1114, process 1113 can receive a request from a client system to discover edge systems nearby a client system location. The cloud system can maintain an edge registry of edge systems within a geographic location. For example, the cloud system can track the locations of edge systems, the functionality loaded onto the edge systems (e.g., workload resources), the network addresses for edge systems, and any other suitable information. The tracked edge system information can be stored at the edge registry. In some implementations, the edge registry can be periodically updated to update locations, functionality, and network addresses for the edge systems.

At block 1116, process 1113 can compare the client device location to edge service locations to generate a set of edge systems. For example, the cloud system can compare the client system location to the edge system locations stored in the registry and generate a set of edge systems nearby the client location (e.g., within a threshold distance, edge systems within a geographic location occupied by the client system). In some implementations, the client system request can include a requested data service, and the cloud system can generate a set of nearby edge systems loaded with a resource that corresponds to the requested data service.

At block 1118, process 1113 can transmit the set of nearby edge services to the client system. In some implementations, the set of nearby edge services transmitted to the client system can include location information, loaded resources/data service capabilities, processing capabilities, network address information, and other suitable edge system information.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for preloading edge systems with workload resources, the method comprising:
   tracking data services rendered at client devices, wherein the data services include rendering via performance of a workload on a visual data stream;
   ranking the tracked data services rendered at client devices in a geographic location according to a predicted demand for the tracked data services;
   selecting a set of data services according to the ranking; and
   preloading one or more edge systems, within the geographic location, with workload resources that correspond to the selected data services, the workload resources configuring the edge systems to perform the selected data services, wherein the edge systems are configured to a) establish a real-time communication session with one or more client devices, b) receive offloaded visual frames from the client devices, c) process the offloaded visual frames using the preloaded workload resources to perform the selected data services, and d) return, in real-time, the processed visual frames to the client devices for display.

2. The method of claim 1, wherein the predicted demand is based on data service usage patterns for client devices located within the geographic location at a first point in time.

3. The method of claim 2, wherein the predicted demand for the tracked data services within the geographic location is updated at a second point in time, a new ranking for the tracked data services is generated according to the updated predicted demand, and the preloaded workload resources are rebalanced among the edge systems in the geographic location based on data service selections according to the new ranking.

4. The method of claim 1, wherein the predicted demand comprises a predicated demand pattern that varies over a period of time, and the predicted demand pattern is generated by a machine learning model trained using historic data service usage for client devices located within the geographic location.

5. The method of claim 1, further comprising:
determining a first number of edge systems within the geographic location for a first data service according to a predicted demand for the first data service; and
preloading the first number of edge systems within the geographic location with a workload resource that corresponds to the first data service.

6. The method of claim 1, further comprising:
determining a first amount of a first workload resource for the geographic location according to a predicted demand for a data service corresponding to the first workload resource; and
preloading the edge systems within the geographic location with the first amount of the first workload resource.

7. The method of claim 1, wherein the workload resources comprise one or more trained machine learning models configured to receive the offloaded visual frames and render the processed visual frames.

8. The method of claim 1, wherein the data services comprise one or more of:
object tracking for objects in the visual frames,
generating overlays, masks, images, or three-dimensional volumes for augmenting the visual frames,
artificial reality video processing for the processed visual frames,
three-dimensional mapped environment video processing for the processed visual frames, or
any combination thereof.

9. The method of claim 1, wherein at least one edge system comprises a cluster edge service with two or more edge devices managed by an edge cluster device manager, and the edge cluster device manager is configured to receive client device requests for data services and route offloaded visual frames to at least one of the edge devices that comprises the cluster edge service.

10. The method of claim 9, wherein the edge cluster device manager is configured to:
select one or more of the edge devices comprising the cluster edge service for a first data service request from a first client device, the selected one or more edge devices comprising a preloaded workload resource that matches the first data service request; and
route offloaded visual frames received from the first client device to the selected one or more edge service devices for processing using the matching preloaded workload resource.

11. The method of claim 9, wherein a first workload resource corresponds to a first data service, a second workload resource corresponds to a second data service, and preloading the cluster edge service comprises preloading the first workload resource to a first edge device that comprises the cluster edge service and preloading the second workload resource to a second edge device that comprises the cluster edge service.

12. A computing system for preloading edge systems with workload resources, the computing system comprising:
one or more processors; and
one or more memories storing instructions that, when executed by the one or more processors, cause the computing system to perform a process comprising:
tracking data services rendered at client devices, wherein the data services include rendering via performance of a workload on a visual data stream;
ranking the tracked data services rendered at client devices in a geographic location according to a predicted demand for the tracked data services;
selecting a set of data services according to the ranking; and
preloading one or more edge systems, within the geographic location, with workload resources that correspond to the selected data services, the workload resources configuring the edge systems to perform the selected data services, wherein the edge systems are configured to a) establish a real-time communication session with one or more client devices, b) receive offloaded visual frames from the client devices, c) process the offloaded visual frames using the preloaded workload resources to perform the selected data services, and d) return the processed visual frames to the client devices for display.

13. The system of claim 12, wherein the predicted demand is based on data service usage patterns for client devices located within the geographic location at a first point in time.

14. The system of claim 13, wherein the predicted demand for the tracked data services within the geographic location is updated at a second point in time, a new ranking for the tracked data services is generated according to the updated predicted demand, and the preloaded workload resources are rebalanced among the edge systems in the geographic location based on data service selections according to the new ranking.

15. The system of claim 12, wherein the predicted demand comprises a predicated demand pattern that varies over a period of time, and the predicted demand pattern is generated by a machine learning model trained using historic data service usage for client devices located within the geographic location.

16. The system of claim 12, wherein the process further comprises:
determining a first number of edge systems within the geographic location for a first data service according to a predicted demand for the first data service; and
preloading the first number of edge systems within the geographic location with a workload resource that corresponds to the first data service.

17. The system of claim 12, wherein the process further comprises:

determining a first amount of a first workload resource for the geographic location according to a predicted demand for a data service corresponding to the first workload resource; and preloading the edge systems within the geographic location with the first amount of the first workload resource.

18. The system of claim 12, wherein the workload resources comprise one or more trained machine learning models configured to receive the offloaded visual frames and render the processed visual frames.

19. The system of claim 12, wherein the data services comprise one or more of:

object tracking for objects in the visual frames, generating overlays, masks, images, or three-dimensional volumes for augmenting the visual frames, artificial reality video processing for the processed visual frames, three-dimensional mapped environment video processing for the processed visual frames, or any combination thereof.

20. A non-transitory computer-readable storage medium storing instructions that, when executed by a computing system, cause the computing system to perform a process for preloading edge systems with workload resources, the process comprising:

tracking data services rendered at client devices, wherein the data services include rendering via performance of a workload on a visual data stream;

ranking the tracked data services rendered at client devices in a geographic location according to a predicted demand for the tracked data services;

selecting a set of data services according to the ranking; and preloading one or more edge systems, within the geographic location, with workload resources that correspond to the selected data services, the workload resources configuring the edge systems to perform the selected data services, wherein the edge systems are configured to a) establish a real-time communication session with one or more client devices, b) receive offloaded visual frames from the client devices, c) process the offloaded visual frames using the preloaded workload resources to perform the selected data services, and d) return the processed visual frames to the client devices for display.

* * * * *